US010945045B2

(12) United States Patent
Hamano

(10) Patent No.: US 10,945,045 B2
(45) Date of Patent: Mar. 9, 2021

(54) SYSTEMS AND METHODS FOR PROVIDING MEDIA CONTENT LISTINGS ACCORDING TO POINTS OF INTEREST

(71) Applicant: Rovi Guides, Inc., San Jose, CA (US)

(72) Inventor: Royce Hamano, Los Angeles, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/596,594

(22) Filed: Oct. 8, 2019

(65) Prior Publication Data
US 2020/0045376 A1 Feb. 6, 2020

Related U.S. Application Data

(63) Continuation of application No. 14/805,939, filed on Jul. 22, 2015, which is a continuation of application (Continued)

(51) Int. Cl.
*H04W 4/02* (2018.01)
*H04N 21/482* (2011.01)
*G06F 16/29* (2019.01)
*G06F 16/58* (2019.01)
*G06F 16/248* (2019.01)
*G06F 16/9535* (2019.01)
*G06F 16/9537* (2019.01)
*G06F 16/2457* (2019.01)
(Continued)

(52) U.S. Cl.
CPC ......... *H04N 21/482* (2013.01); *G06F 16/248* (2019.01); *G06F 16/24575* (2019.01); *G06F 16/29* (2019.01); *G06F 16/58* (2019.01); *G06F 16/9535* (2019.01); *G06F 16/9537* (2019.01); *H04W 4/029* (2018.02); *G01S 5/0027* (2013.01)

(58) Field of Classification Search
CPC .. H04W 4/02; H04W 64/00; H04L 29/08657; H04L 29/08108; H04L 29/08936; G01S 5/0252; G01S 5/02; G01S 5/14; G01S 5/0263; G01S 5/0242; G01S 17/48; G01S 5/16; H04M 1/72572; G01C 21/0263; G01C 21/20
See application file for complete search history.

(56) References Cited

U.S. PATENT DOCUMENTS 4,536,791 A 8/1985 Campbell et al.
4,694,490 A 9/1987 Harvey et al.
(Continued)

FOREIGN PATENT DOCUMENTS

CA 2285645 7/1998
EP 1 691 211 A2 8/2006
(Continued)

*Primary Examiner* — Dai Phuong
(74) *Attorney, Agent, or Firm* — Haley Guiliano LLP

(57) ABSTRACT

Systems and methods are provided for allowing a user to obtain a listing of points of interest and associated media content listings based on the user's current geographic location. The user's current geographic location may be determined using, for example, a GPS transceiver incorporated in the user's user access device. Information may then be communicated from a remote server to the user access device that identifies points of interest associated with the geographic location as well as media content listings associated with the points of interest.

27 Claims, 12 Drawing Sheets

Related U.S. Application Data

No. 12/779,835, filed on May 13, 2010, now Pat. No. 9,122,701.

(51) Int. Cl.
    *H04W 4/029*     (2018.01)
    *G01S 5/00*     (2006.01)

(56) References Cited

U.S. PATENT DOCUMENTS

| | | |
|---|---|---|
| 4,996,642 A | 2/1991 | Hey |
| 5,099,319 A | 3/1992 | Esch et al. |
| 5,155,591 A | 10/1992 | Wachob |
| 5,212,553 A | 5/1993 | Maruoka |
| 5,223,924 A | 6/1993 | Strubbe |
| 5,335,277 A | 8/1994 | Harvey et al. |
| 5,351,075 A | 9/1994 | Herz et al. |
| 5,353,121 A | 10/1994 | Young et al. |
| 5,374,951 A | 12/1994 | Welsh |
| 5,410,344 A | 4/1995 | Graves et al. |
| 5,446,919 A | 8/1995 | Wilkins |
| 5,452,012 A | 9/1995 | Saitoh |
| 5,483,278 A | 1/1996 | Strubbe et al. |
| 5,485,197 A | 1/1996 | Hoarty |
| 5,488,409 A | 1/1996 | Yuen et al. |
| 5,502,504 A | 3/1996 | Marshall et al. |
| 5,515,098 A | 5/1996 | Carles |
| 5,526,257 A | 6/1996 | Lerner |
| 5,534,911 A | 7/1996 | Levitan |
| 5,557,721 A | 9/1996 | Fite et al. |
| 5,559,548 A | 9/1996 | Davis et al. |
| 5,559,549 A | 9/1996 | Hendricks et al. |
| 5,572,442 A | 11/1996 | Schulhof et al. |
| 5,574,962 A | 11/1996 | Fardeau et al. |
| 5,585,838 A | 12/1996 | Lawler et al. |
| 5,585,866 A | 12/1996 | Miller et al. |
| 5,589,892 A | 12/1996 | Knee et al. |
| 5,592,551 A | 1/1997 | Lett et al. |
| 5,594,509 A | 1/1997 | Florin et al. |
| 5,600,364 A | 2/1997 | Hendricks et al. |
| 5,600,573 A | 2/1997 | Hendricks et al. |
| 5,610,653 A | 3/1997 | Abecassis |
| 5,621,456 A | 4/1997 | Florin et al. |
| 5,623,613 A | 4/1997 | Rowe et al. |
| 5,629,733 A | 5/1997 | Youman et al. |
| 5,635,978 A | 6/1997 | Alten et al. |
| 5,635,979 A | 6/1997 | Kostreski et al. |
| 5,636,346 A | 6/1997 | Saxe |
| 5,657,072 A | 8/1997 | Aristides et al. |
| 5,657,091 A | 8/1997 | Bertram |
| 5,659,350 A | 8/1997 | Hendricks et al. |
| 5,663,757 A | 9/1997 | Morales |
| 5,666,293 A | 9/1997 | Metz |
| 5,666,645 A | 9/1997 | Thomas et al. |
| 5,677,708 A | 10/1997 | Matthews, III et al. |
| 5,682,195 A | 10/1997 | Hendricks et al. |
| 5,686,954 A | 11/1997 | Yoshinobu et al. |
| 5,687,331 A | 11/1997 | Volk et al. |
| 5,724,521 A | 3/1998 | Dedrick |
| 5,734,853 A | 3/1998 | Hendricks et al. |
| 5,740,549 A | 4/1998 | Reilly et al. |
| 5,749,043 A | 5/1998 | Worthy |
| 5,754,939 A | 5/1998 | Herz et al. |
| 5,758,257 A | 5/1998 | Herz et al. |
| 5,760,821 A | 6/1998 | Ellis et al. |
| 5,774,170 A | 6/1998 | Hite et al. |
| 5,781,246 A | 7/1998 | Alten et al. |
| 5,790,426 A | 8/1998 | Robinson |
| 5,790,935 A | 8/1998 | Payton |
| 5,793,409 A | 8/1998 | Tetsumura |
| 5,798,785 A | 8/1998 | Hendricks et al. |
| 5,801,747 A | 9/1998 | Bedard |
| 5,801,785 A | 9/1998 | Crump et al. |
| 5,805,154 A | 9/1998 | Brown |
| 5,808,694 A | 9/1998 | Usui et al. |
| 5,819,156 A | 10/1998 | Belmont |
| 5,822,123 A | 10/1998 | Davis et al. |
| 5,842,010 A | 11/1998 | Jain et al. |
| 5,842,199 A | 11/1998 | Miller et al. |
| 5,844,620 A | 12/1998 | Coleman et al. |
| 5,848,396 A | 12/1998 | Gerace |
| 5,850,218 A | 12/1998 | LaJoie et al. |
| 5,867,226 A | 2/1999 | Wehmeyer et al. |
| 5,872,588 A | 2/1999 | Aras et al. |
| 5,886,691 A | 3/1999 | Furuya et al. |
| 5,886,731 A | 3/1999 | Ebisawa |
| 5,900,905 A | 5/1999 | Shoff et al. |
| 5,907,323 A | 5/1999 | Lawler et al. |
| 5,918,014 A | 6/1999 | Robinson |
| 5,920,700 A | 7/1999 | Gordon et al. |
| 5,940,073 A | 8/1999 | Klosterman et al. |
| 5,945,988 A | 8/1999 | Williams et al. |
| 5,951,642 A | 9/1999 | Onoe et al. |
| 5,953,005 A | 9/1999 | Liu |
| 5,974,222 A | 10/1999 | Yuen et al. |
| 5,977,964 A | 11/1999 | Williams et al. |
| 5,990,927 A | 11/1999 | Hendricks et al. |
| 5,991,735 A | 11/1999 | Gerace |
| 6,002,393 A | 12/1999 | Hite et al. |
| 6,002,394 A | 12/1999 | Schein et al. |
| 6,005,597 A | 12/1999 | Barrett et al. |
| 6,018,372 A | 1/2000 | Etheredge |
| 6,020,929 A | 2/2000 | Marshall et al. |
| 6,025,837 A | 2/2000 | Matthews, III et al. |
| 6,029,045 A | 2/2000 | Picco et al. |
| 6,029,176 A | 2/2000 | Cannon |
| 6,029,195 A | 2/2000 | Herz |
| 6,052,145 A | 4/2000 | Macrae et al. |
| 6,061,082 A | 5/2000 | Park |
| 6,064,376 A | 5/2000 | Berezowski et al. |
| 6,064,980 A | 5/2000 | Jacobi et al. |
| 6,078,348 A | 6/2000 | Klosterman et al. |
| 6,112,186 A | 8/2000 | Bergh et al. |
| 6,118,492 A | 9/2000 | Milnes et al. |
| 6,119,098 A | 9/2000 | Guyot et al. |
| 6,151,059 A | 11/2000 | Schein et al. |
| 6,157,413 A | 12/2000 | Hanafee et al. |
| 6,160,570 A | 12/2000 | Sitnik |
| 6,163,316 A | 12/2000 | Killian |
| 6,172,677 B1 | 1/2001 | Stautner et al. |
| 6,177,931 B1 | 1/2001 | Alexander et al. |
| 6,181,335 B1 | 1/2001 | Hendricks et al. |
| 6,186,287 B1 | 2/2001 | Heidenreich et al. |
| 6,201,536 B1 | 3/2001 | Hendricks et al. |
| 6,239,794 B1 | 5/2001 | Yuen et al. |
| 6,240,555 B1 | 5/2001 | Shoff et al. |
| 6,262,721 B1 | 7/2001 | Tsukidate et al. |
| 6,263,501 B1 | 7/2001 | Schein et al. |
| 6,263,507 B1 | 7/2001 | Ahmad et al. |
| 6,286,140 B1 | 9/2001 | Ivanyi |
| 6,298,482 B1 | 10/2001 | Seidman et al. |
| 6,312,336 B1 | 11/2001 | Handelman et al. |
| 6,323,911 B1 | 11/2001 | Schein et al. |
| 6,331,877 B1 | 12/2001 | Bennington et al. |
| 6,363,525 B1 | 3/2002 | Dougherty et al. |
| 6,366,890 B1 | 4/2002 | Usrey |
| 6,388,714 B1 | 5/2002 | Schein et al. |
| 6,389,593 B1 | 5/2002 | Yamagishi |
| 6,392,710 B1 | 5/2002 | Gonsalves et al. |
| 6,408,437 B1 | 6/2002 | Hendricks et al. |
| 6,412,110 B1 | 6/2002 | Schein et al. |
| 6,453,471 B1 | 9/2002 | Klosterman |
| 6,463,585 B1 | 10/2002 | Hendricks et al. |
| 6,469,753 B1 | 10/2002 | Klosterman et al. |
| 6,515,680 B1 | 2/2003 | Hendricks et al. |
| 6,530,082 B1 | 3/2003 | Del Sesto et al. |
| 6,539,548 B1 | 3/2003 | Hendricks et al. |
| 6,545,722 B1 | 4/2003 | Schultheiss et al. |
| 6,564,378 B1 | 5/2003 | Satterfield et al. |
| 6,637,029 B1 | 10/2003 | Maissel et al. |
| 6,698,020 B1 | 2/2004 | Zigmond et al. |
| 6,704,931 B1 | 3/2004 | Schaffer et al. |
| 6,738,978 B1 | 5/2004 | Hendricks et al. |
| 6,756,997 B1 | 6/2004 | Ward, III et al. |

(56) References Cited

U.S. PATENT DOCUMENTS

| | | |
|---|---|---|
| 6,792,618 B1 | 9/2004 | Bendinelli et al. |
| 6,983,478 B1 | 1/2006 | Grauch et al. |
| 7,047,550 B1 | 5/2006 | Yasukawa et al. |
| 7,071,842 B1 | 7/2006 | Brady |
| 7,117,518 B1 | 10/2006 | Takahashi et al. |
| 7,165,098 B1 | 1/2007 | Boyer et al. |
| 7,774,487 B2 | 8/2010 | Chaudhry |
| 8,479,107 B2 | 7/2013 | Vainio et al. |
| 8,504,089 B2 | 8/2013 | Stewart |
| 2002/0059602 A1 | 5/2002 | Macrae et al. |
| 2002/0112239 A1 | 8/2002 | Goldman |
| 2002/0174430 A1 | 11/2002 | Ellis et al. |
| 2003/0110499 A1 | 6/2003 | Knudson et al. |
| 2004/0110515 A1* | 6/2004 | Blumberg ............... H04L 67/04 455/456.1 |
| 2004/0194138 A1 | 9/2004 | Boylan, III et al. |
| 2004/0203663 A1 | 10/2004 | Boman et al. |
| 2005/0028208 A1 | 2/2005 | Ellis et al. |
| 2005/0251827 A1 | 11/2005 | Ellis et al. |
| 2005/0278741 A1 | 12/2005 | Robarts et al. |
| 2006/0161952 A1 | 7/2006 | Hertz et al. |
| 2006/0211446 A1 | 9/2006 | Wittmann et al. |
| 2006/0242009 A1 | 10/2006 | Crolley |
| 2007/0010261 A1 | 1/2007 | Dravida et al. |
| 2007/0078596 A1* | 4/2007 | Grace ................ G01C 21/3476 701/533 |
| 2007/0129003 A1 | 6/2007 | Dunko |
| 2008/0147730 A1 | 6/2008 | Lee et al. |
| 2008/0189390 A1 | 8/2008 | Heller et al. |
| 2009/0156234 A1 | 6/2009 | Sako et al. |
| 2010/0087209 A1 | 4/2010 | Holm et al. |
| 2010/0159898 A1 | 6/2010 | Krzyzanowski et al. |
| 2010/0273463 A1 | 10/2010 | Bonnefoy et al. |
| 2011/0055874 A1 | 3/2011 | Libin et al. |
| 2011/0161875 A1 | 6/2011 | Kankainen |
| 2011/0199479 A1 | 8/2011 | Waldman |
| 2012/0295597 A1 | 11/2012 | Louch et al. |
| 2013/0124494 A1 | 5/2013 | Ranjan et al. |
| 2013/0225206 A1 | 8/2013 | Shuman |
| 2015/0038177 A1 | 2/2015 | Morin |
| 2016/0021200 A1 | 1/2016 | Oh |
| 2016/0205505 A1 | 7/2016 | Frazier |
| 2017/0074675 A1* | 3/2017 | Waldman ............ G01C 21/3682 |
| 2017/0099300 A1 | 4/2017 | Rittmaster |

FOREIGN PATENT DOCUMENTS

| | | |
|---|---|---|
| GB | 2 448 874 A | 11/2008 |
| WO | WO 97/12486 | 4/1997 |
| WO | WO 97/13368 | 4/1997 |
| WO | WO 99/04561 | 1/1999 |
| WO | WO 2010/035079 A1 | 4/2010 |

* cited by examiner

SYSTEMS AND METHODS FOR PROVIDING MEDIA CONTENT LISTINGS ACCORDING TO POINTS OF INTEREST

CROSS-REFERENCE TO RELATED APPLICATIONS

This application is a continuation of U.S. patent application Ser. No. 14/805,939, filed Jul. 22, 2015, which is a continuation of Ser. No. 12/779,835 (now U.S. Pat. No. 9,122,701), filed May 13, 2010, each of which is hereby incorporated by reference herein in its entirety, respectively.

BACKGROUND OF THE INVENTION

The present invention is generally directed to providing media content and media content listings, and more particularly the present invention is directed to providing media content and media content listings based at least in part on geographic location. Conventional media content listing systems, such as television program guides, deliver listings and content to end users who use stationary equipment. For example, users typically access television program listings on a stationary television that may be connected to a stationary set-top box.

With the increase in popularity of mobile devices, such as smartphones, and the increasing amount of content available for access from such devices comes a need to organize the content bearing in mind the mobile nature of the device on which the content will be accessed. It would therefore be desirable to provide a way to organize and suggest content to the user based on, for example, geographic location.

SUMMARY OF THE INVENTION

In some embodiments of the present invention, systems and methods are provided for a media guidance application that allows a user to obtain media content listings associated with a particular geographical location. The media guidance application may provide the user with the ability to input the particular geographical location into a user equipment device. The user equipment device may be, for example, any suitable mobile device such as a smartphone, laptop, tablet computing device, or any other suitable device that may have wireless communications capabilities.

The media guidance application may communicate information regarding the geographical location to a remote server (e.g., that may be part of a distribution facility). This communication may take place over, for example, a wireless communications network. The remote server may process the information to determine appropriate media content listings to provide according to, for example, media consumption data. The media consumption data may be acquired from monitoring other users' usage of their respective media guidance applications based on, for example, real-time clickstream data. For example, the other users may be selected based on the fact that they were visiting the vicinity of the geographic location (i.e., but do not actually reside there). In some embodiments, the other users may have been visiting from the same location in which the current user attempting to access the appropriate media content listings is currently located or resides.

The geographic location of users and their respective user equipment devices may be obtained either manually (e.g., the user enters the information manually) or automatically using, for example, any suitable location detection system such as a system based on a global positioning satellite (GPS) (i.e., in which a GPS transceiver is incorporated into the user equipment device). The media guidance application may associate this location information in real-time with the content listings and corresponding content being accessed from the respective user equipment device. This information may be stored in a database in the remote server.

In some embodiments of the present invention, system and methods are provided for a media guidance application that allows a user to obtain media content listings that correspond to media content associated with points of interest in the vicinity of the user's current geographic location. The media guidance application may obtain information indicative of the user's (and the user equipment device's) geographic location using, for example, a GPS system that may be incorporated into the user equipment device. This information may be communicated by the media guidance application to a remote server, which may be part of a distribution facility. The remote server may include a database of media content data, including data which may be searched to identify points of interest associated with particular geographic locations. The points of interest may, in turn be associated with media content listings. For example, a particular geographic location may be associated with a particular landmark at which a certain scene of a movie was filmed. The media guidance application may determine the user equipment device's geographic location and the communicate it to the remote server which identifies the landmark and the associated scene of the movie. The remote server may then communicate information about the landmark and the movie to the user equipment device, which may display the information in the form of, for example, media content listings, to the user.

The media guidance application may gather information about points of interest and associated media content and media content listings based on information provided by users, based on predefined data, or both. For example, the media guidance information may provide the user with the ability to enter information about points of interest and associated media content based on the user's current geographic location (i.e., which the media guidance application may automatically determine using, for example, GPS). The information about the geographic location, the points of interest, and the media content may then be communicated to the remote server, which may, for example, store the information (or data derived from the information) in a database with the appropriate associations.

BRIEF DESCRIPTION OF THE DRAWINGS

Features of the invention, its nature, and various advantages will be apparent upon consideration of the following detailed description, taken in conjunction with the accompanying drawings, in which like reference characters refer to like parts throughout, and in which.

DETAILED DESCRIPTION OF EMBODIMENTS

Figure 1:
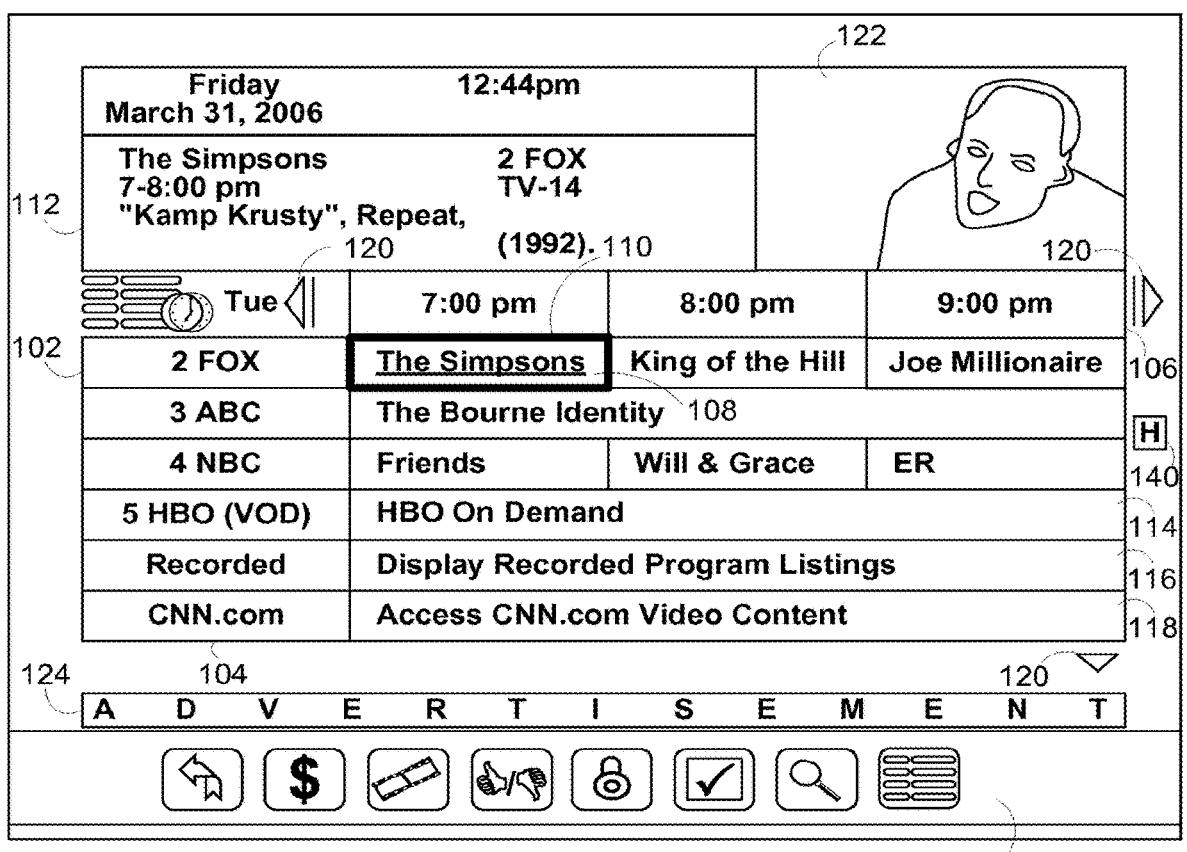
FIG. 1 shows an grid program listings display screen in accordance with some embodiments of the present invention.

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are guidance applications that, among other things, allow users to navigate among and locate many types of media content including conventional television programming (provided via traditional broadcast, cable, satellite, Internet, or other means), as well as pay-per-view programs, on-demand programs (using, for example, video-on-demand (VOD) systems), Internet content (e.g., streaming media, downloadable media, Webcasts, any other suitable Internet content, or any combination thereof), and other types of media or video content. Guidance applications also allow users to navigate among and locate content related to the video content including, for example, video clips, articles, advertisements, chat sessions, games, any other type of related content, or any combinations thereof. Guidance applications also allow users to navigate among and locate multimedia content. The term multimedia is defined herein as media and content that utilizes at least two different content forms, such as text, audio, still images, animation, video, and interactivity content forms. Multimedia content may be recorded and played, displayed or accessed by information content processing devices, such as computerized and electronic devices, but can also be part of a live performance. It should be understood that the embodiments of the present invention that are discussed in relation to media content are also applicable to other types of content, such as video, audio and/or multimedia.

With the promulgation of the Internet, mobile computing, and high-speed wireless networks, users are able to access media on personal computers (PCs) and on other devices such as hand-held computers, tablet computers, in-vehicle computers, personal digital assistants (PDAs), smartphones, mobile telephones, internet phones, satellite phones, in-vehicle phones or interface systems, digital cameras, video players, music players, gaming machines, vehicle navigation systems, other mobile devices, and any combination thereof. On these devices users may be able to navigate among and locate the same or substantially the same or similar media available through a television. Consequently, media guidance would be beneficial on these devices as well. The guidance provided may be for media content available only through a television, for media content available only through one or more of these devices, or for media content available both through a television and one or more of these devices. The media guidance applications may be provided as Internet-based on-line applications (e.g., provided on a web-site), or as stand-alone applications or clients on hand-held computers, tablet computers, in-vehicle computers, PDAs, smartphones, mobile telephones, internet phones, satellite phones, in-vehicle phones or interface systems, digital cameras, video players, music players, gaming machines, vehicle navigation systems, or other mobile devices. These devices may also include hardware, software, or both to determine the geographic location of the device (e.g., satellite positioning system (e.g., GPS), antenna triangulation system, wifi capability, any other suitable hardware, software, or both, or any combination thereof). Content accessed or provided by a mobile device may be associated with the geographic location of the mobile device. The various devices and platforms that may use media guidance applications are described in more detail below.

One of the functions of the media guidance application is to provide media listings and media information to users. FIGS. 1-2 and 8-12 show illustrative display screens that may be used to provide media guidance, and in particular media listings, media content associated with geographic location, and updates to databases of media content data and geographic location associations. The display screens shown in FIGS. 1-2 and 8-12 may be implemented on any suitable device or platform. While the displays of FIGS. 1-2 and 8-12 are illustrated as full screen displays, they may also be fully or partially overlaid over media content being displayed. A user may access or indicate a desire to access media information by selecting a selectable option provided in a display screen (e.g., a menu option, a listings option, an icon, a hyperlink, any other suitable option, or any combination thereof), pressing a dedicated button (e.g., a GUIDE button, a soft key, any other suitable button, or any combination thereof) on a user equipment device, making a selection using a touchscreen or other user input interface or device, any other suitable option, or any combination thereof. In some embodiments of the present invention, the media guidance application may take input from a user using voice commands.

In response to the user's indication, the media guidance application may provide a display screen with media information organized in any suitable way. For example, media information may be organized in a grid format, in a list, by any suitable grouping, in any other suitable way, or any combination thereof. In some embodiments, media information such as media listings or links to media content, may be organized by time and channel in a grid, by popularity, by location, by time, by channel, by media type, by category (e.g., movies, television, radio, sports, news, children, web content or other categories of programming), or other pre-defined, user-defined, or other organization criteria. In some embodiments, media information may be sorted and/or organized according to popularity.

In addition to providing access to linear media content provided according to a schedule, the media guidance application may also provide access to non-linear media content which is not provided according to a schedule. Non-linear media content may include content from different media sources including on-demand media content (e.g., VOD), Internet content (e.g., streaming media, downloadable media, multimedia metadata, etc.), locally stored media content (e.g., video content stored on a smartphone, tablet computer, vehicle navigation system, CD, DVD, etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP). The various permutations of the types of listings that may be displayed that are different than display 800 may be based on user selection or guidance application definition (e.g., a display of only movie and radio listings, only news and Internet content listings, etc.). In some embodiments, a user may access additional listings in accordance with some embodiments of the present invention.

The media guidance application may be personalized based on a user's preferences. A personalized media guidance application may allow a user to customize displays and features to create a personalized "experience" with the media guidance application. This personalized experience may be created by allowing one or more users to input these customizations, by the media guidance application monitoring user activity to determine various user preferences, or both. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, any other suitable scheme, or any combination thereof), aspects of media content listings displayed (e.g., only HDTV media content, user-specified media types based on favorite media type selections, re-ordering the display of media types, recommended media content, any other suitable aspect, or any combination thereof), desired recording features (e.g., recording or series recordings for particular users, recording quality, any other suitable recording feature, or any combination thereof), parental control settings, any other desired customizations, or any combination thereof.

The media guidance application may allow a user to provide user profile information, may automatically compile user profile information from one or more users, or both. The media guidance application may, for example, monitor the media the user accesses, the geographic location where the user accesses the media, and/or other interactions the user may have with the guidance application. Additionally, the media guidance application may obtain all or part of other user profiles that are related to a particular user (e.g., from other users near the geographic location of the user, from other web sites on the Internet the user accesses, such as www.tvguide.com, from other media guidance applications the user accesses, from other interactive applications the user accesses, from a handheld device of the user, any other suitable information, or any combination thereof), and/or obtain information about the user from other sources that the media guidance application may access. As a result, a user may be provided with a unified guidance application experience across the user's equipment devices in accordance with some embodiments of the present invention. Additional personalized media guidance application features are described in greater detail in Ellis et al., U.S. patent application Ser. No. 11/179,410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

Figure 2:
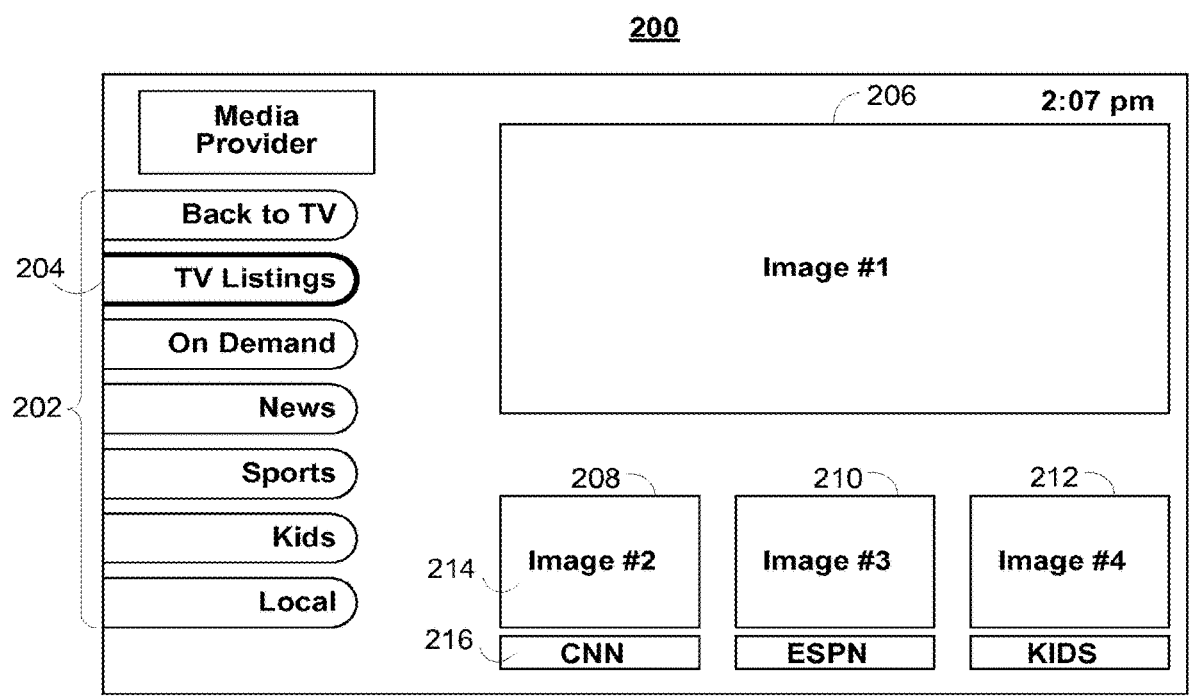
FIG. 2 shows an illustrative video mosaic display screen in accordance with some embodiments.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
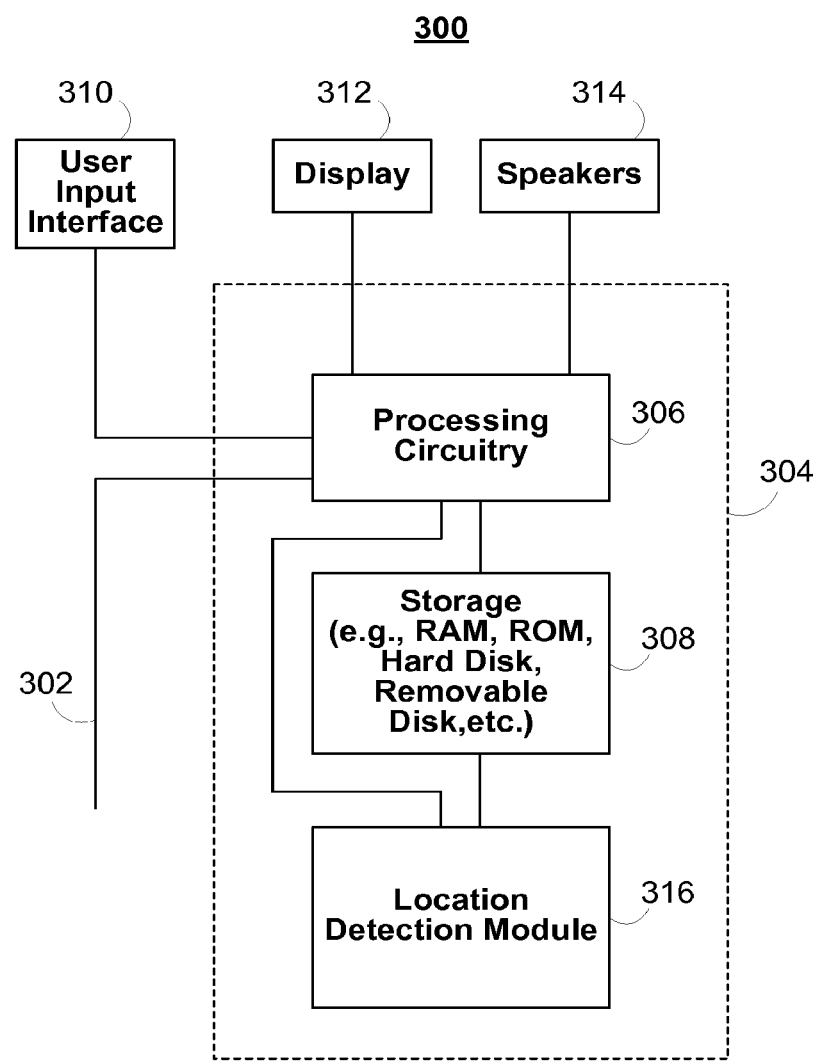
FIG. 3 shows a generalized embodiment of an illustrative user equipment device in accordance with some embodiments.

Users may access media content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive media content and data via input/output (hereinafter "I/O") path 302. I/O path 302 may provide media content (e.g., broadcast programming, on-demand programming, Internet content, video, audio, any other suitable content, or any combination thereof) and data to control circuitry 304, which includes processing circuitry 306, storage 308, and location detection module 316. Control circuitry 304 may be used to send and receive commands, requests, and other suitable data using I/O path 302. I/O path 302 may connect control circuitry 304 (and specifically processing circuitry 306) to one or more communications paths in accordance with some embodiments of the present invention (including wireless communications networks, paths, or both). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths in accordance with some embodiments of the present invention. In addition, communications circuitry may include circuitry that enables peer-to-peer communication of user equipment devices, or communication of user equipment devices in locations remote from each other.

Memory (e.g., random-access memory, read-only memory, any other suitable memory, or any combination thereof), hard drives, optical drives, any other suitable fixed or removable storage devices (e.g., DVD recorder, CD recorder, video cassette recorder, or other suitable recording device), or any combination thereof may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

Location detection module 316 may include hardware, software, or both to determine the geographic location of the user equipment device (e.g., satellite positioning system (e.g., GPS), antenna triangulation system, wifi capability, any other suitable hardware, software, or both, or any combination thereof). For purposes of clarity, and not by way of limitation, the location determining features of the present invention with respect to user equipment will be referred to herein as a location detection module (e.g. location detection module 316), a location detection computing device, or a location detection adapter. It will be understood that this term refers not only to global positioning satellite systems but also to other types of positioning systems (such as regional satellite systems), antenna triangulation, location tracking via Internet protocol (IP) address, any other suitable location determining mechanism, or any combination thereof. In some embodiments, content accessed or provided by a user equipment device may be associated with the geographic location of the user equipment device.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from the VBI of a television channel, from an out-of-band feed, or using another suitable approach). In another embodiment, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In yet other embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be a EBIF widget. In other embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
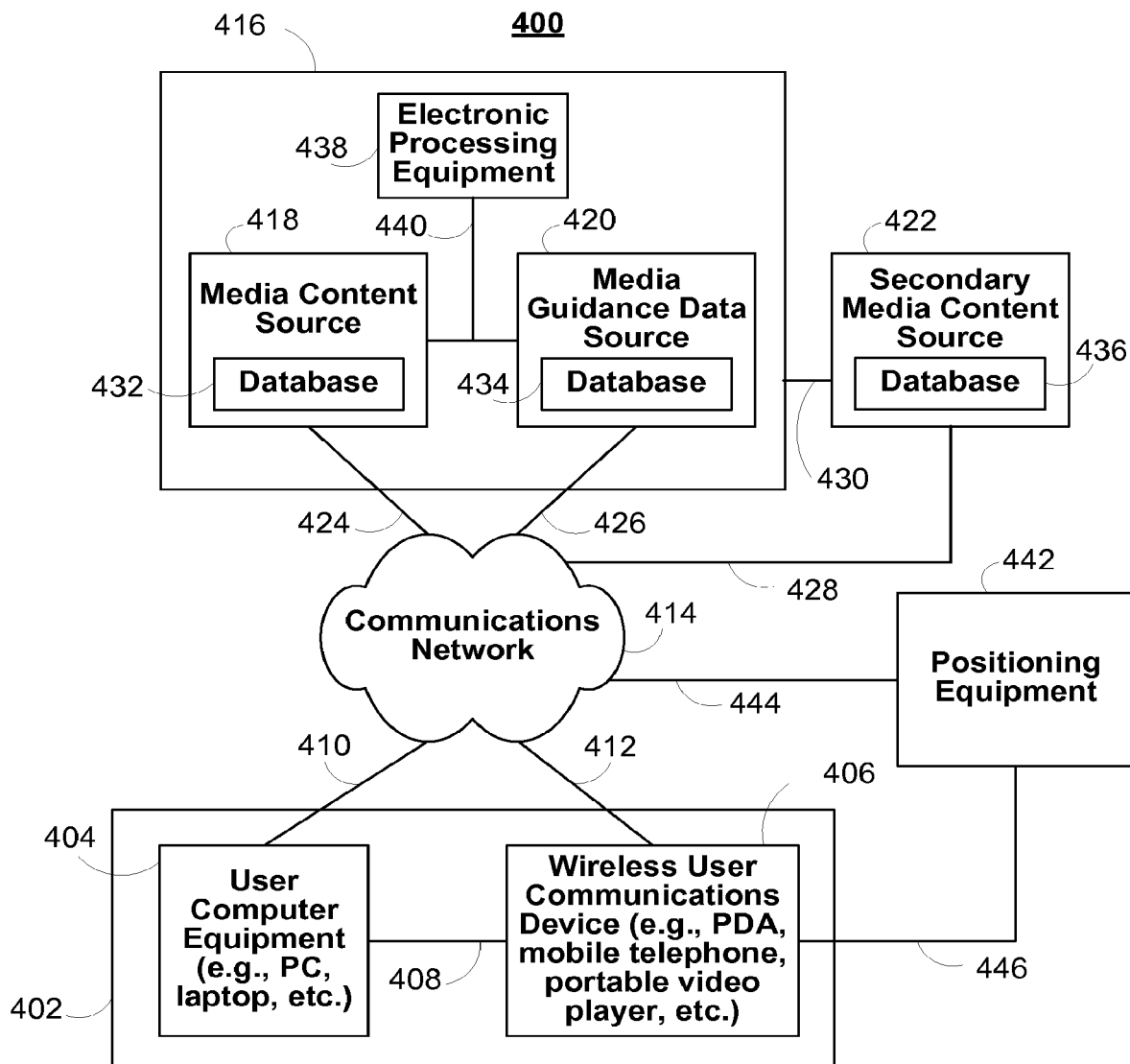
FIG. 4 shows an illustrative system in accordance with some embodiments.

User equipment device 300 of FIG. 3 may be implemented in system 400 of FIG. 4 as user computer equipment 404, wireless user communications device 406, any other type of user equipment suitable for accessing media, or any combination thereof. User equipment devices, on which a media guidance application is implemented, may function as a standalone device or may be part of an installation and/or a network of devices. Various network configurations of devices may be implemented and are discussed in more detail below.

A generalized embodiment of the system of the disclosure is shown as illustrative system 400 in FIG. 4. In some embodiments, installation 402 may comprise user computer equipment 404, wireless user communications device 406, any other type suitable user equipment device (e.g., television equipment, gaming equipment, vehicular navigation equipment, etc.), or any combination thereof. For simplicity, these devices may be referred to herein collectively as user equipment or user equipment devices. User equipment, on which a media guidance application may be used in whole or in part, may function as a standalone device or may be part of a network of devices. For example, installation 402 may be a vehicle (e.g., automobile, scooter, motorcycle, bicycle, airplane, boat, train, tram, or any other suitable vehicle), a dwelling, or any other suitable stationary or mobile location. Various network configurations of devices may be used and are discussed in more detail below.

User computer equipment 404 may include a PC, a laptop, a tablet computer, an in-vehicle computer, a gaming computer, a personal computer television (PC/TV), a PC media server, a PC media center, or other user computer equipment. Wireless user communications device 406 may include a PDA, a smartphone, a mobile telephone, an internet phone, a satellite phone, an in-vehicle phone or interface system, a digital camera, a portable video player, a portable music player, a portable gaming machine, a wifi enabled laptop, netbook, or tablet computer, a 3G (or other cellular network) enabled laptop, netbook, or tablet computer, any other suitable wireless device, or any combination thereof.

It should be noted that with the availability of television tuner cards for PC's and the integration of video into other user equipment devices, the lines have become blurred when trying to classify a device as one of the above devices. In fact, each of user computer equipment 404 and wireless user communications device 406 may utilize at least some of the system features described above in connection with installation 402 and, as a result, include flexibility with respect to the type of media content available on the device. For example, user computer equipment 404 and/or wireless user communications device 406 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there may be more than one of each type of user equipment device but only one of each is shown in FIG. 4 to avoid overcomplicating the drawing. In addition, each user may utilize more than one type of user equipment device (e.g., a user may have a smartphone and a tablet computer) and also more than one of each type of user equipment device (e.g., a user may have a PDA and a mobile telephone and/or multiple vehicle navigation systems).

The user may also set various settings to maintain consistent media guidance application settings across in-home devices and remote devices. Settings include those described herein, as well as channel and program favorites, media content preferences that the guidance application utilizes to make media content recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user computer equipment 404 and wireless user communications device 406 may be coupled to communications network 414 via communications paths 410 and 412, respectively. Communications network 414 may be one or more networks including the Internet, a mobile phone network, mobile device (e.g., Blackberry) network, cable network, public switched telephone network, wifi network, satellite network, local area network (LAN), wireless local area network (WLAN), or other types of communications network or combinations of communications networks. BLACKBERRY is a service mark owned by Research In Motion Limited Corp. Paths 410 and 412 may separately or together include one or more communications paths, such as a satellite path, a fiber-optic path, a cable path, a path that supports Internet communications (e.g., IPTV), free-space connections (e.g., for broadcast or other wireless signals), any other suitable wired or wireless communications path, or any combination of such paths. Communications with the user equipment devices may be provided by one or more of these communications paths, but are shown as a single path in FIG. 4 to avoid overcomplicating the drawing.

User equipment devices may communicate directly with each other via communication path 408, which may be similar to those described above in connection with paths 410 and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 may include positioning equipment 442, which may communicate with communications network 414 and wireless user communications device 406 through communications paths 444 and 446, respectively. In some embodiments, positioning equipment 442 may be a cellular communications tower, a satellite communications tower, or both. In some embodiments, positioning equipment 442 may be used to determine the geographic location of one or more user equipment devices in accordance with some embodiments of the present invention. Communications paths 444 and 446 may include any of the communication paths described above in connection with paths 408, 410, and 412 and may be exchanged over one or more communications paths, but are shown as a single path in FIG. 4 to avoid overcomplicating the drawing.

System 400 may include distribution facility 416, which may include media content source 418 (including electronic database 432), media guidance data source 420 (including electronic database 434), or both coupled to communications network 414 via communication paths 424 and 426, respectively. In addition, system 400 may include more than one of each of media content source 418 and media guidance data source 420, such as secondary media content source 422 (including electronic database 436), which may be connected to communications network 414 through communications path 428. Electronic databases 432, 434, 436, any other suitable database, or any combination thereof may contain data related to content consumption, points of interest, any other suitable data, or any combination thereof in accordance with some embodiments of the present invention.

Distribution facility 416 may also include electronic processing equipment 438, which may communicate with other distribution components via communications path 440. Communications path 440 may be any suitable communications network or path in accordance with some embodiments of the present invention. For simplicity, these sources may be referred to herein collectively as distribution equipment or distribution components and may be represented herein as user distribution facility 416. In some embodiments, additional distribution components, such as secondary media content source 422, may be included in distribution facility 416. In some embodiments, additional distribution components, such as secondary media content source 422, may be separate from distribution facility 416 (e.g., website, third-party database, etc.) and may be connected to distribution facility 416 through communications path 430. Only one distribution component is shown in FIG. 4 to avoid overcomplicating the drawing. Distribution facility 416 may be arranged in any suitable configuration, such as comprising a single geographic location and/or server, comprising distribution amongst multiple locations and/or servers, comprising an integrated media content and media guidance source, comprising a combination of separate distribution components, any other suitable configuration, or any combination thereof.

Communications paths 424, 426, 428, and 440 may include any of the communication paths described above in connection with paths 408, 410, and 412. Communications with the media content source 418, media guidance data source 420, and any additional distribution components, such as secondary media content source 422, may be exchanged over one or more communications paths, but are shown as a single path in FIG. 4 to avoid overcomplicating the drawing. In some embodiments, media content source 418 and media guidance data source 420 may be integrated as one source device. Although communications between distribution components 418, 420 and 438 with user equipment devices 404 and 406 are shown as through communications network 414, in some embodiments, sources 418, 420, and 438 may communicate directly with user equipment devices 404 and 406 via communication paths such as those described above in connection with paths 408, 410 and 412.

Although communications paths are not drawn between distribution components, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The distribution components may also communicate with each other directly through an indirect path via communications network 414.

Media content source 418 may include one or more types of media distribution equipment including a distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 418 may be the originator of media content (e.g., a television broadcaster, a Webcast provider, etc.) or may not be the originator of media content (e.g., an on-demand media content provider, an Internet provider of video content of broadcast programs for downloading, etc.). Media content source 418 may include cable sources, satellite providers, on-demand providers, Internet providers, or other providers of media content. Media content source 418 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 420 may provide media guidance data, such as media listings, media-related information (e.g., broadcast times, broadcast channels, media titles, media descriptions, ratings information (e.g., parental control ratings, critic's ratings, consumption rates, popularity, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 420 may be provided to users' equipment using a client-server approach. For example, a guidance application client residing on the user's equipment may initiate sessions with source 420 to obtain guidance data when needed. In some embodiments, media guidance data source 420 may provide user equipment devices with the media guidance application itself or software updates for the media guidance application.

Media guidance applications may be, for example, stand-alone applications used on user equipment devices. In other embodiments, media guidance applications may be client-server applications where only the client resides on the user equipment device. For example, media guidance applications may be used partially as a client application on the control circuitry of a user equipment device and partially on a remote server as a server application (e.g., media guidance data source 420). The guidance application displays may be generated by the media guidance data source 420 and transmitted to the user equipment devices. The media guidance data source 420 may also transmit data for storage on the user equipment, which may then generate the guidance application displays based on instructions processed by control circuitry.

System 400 is intended to illustrate a number of approaches and/or network configurations, by which user equipment devices and distribution components may communicate with each other for the purpose of accessing media and providing media guidance. The present invention may be used in any one or a subset of these approaches, or in a system employing other approaches for delivering media and providing media guidance. The following three approaches provide specific illustrations of the generalized example shown in FIG. 4.

In one approach, user equipment devices may communicate with each other within a home network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have vehicular networks that are accessed by in-vehicle and mobile devices. Users may control in-vehicle devices via a media guidance application on a remote device. For example, users may access an online media guidance application on a website via an in-vehicle computer, or a mobile device such as a tablet computer or web-enabled mobile telephone. The user may set various settings (e.g., recordings, reminders, or other settings) on the online guidance application to control the user's in-vehicle equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside of a vehicle 402 may use the media guidance application to communicate with distribution equipment to access media content and media content information (e.g., media content listings). Specifically, users of user computer equipment 404 may access the media guidance application to navigate among and locate desirable media content. Users may also access the media guidance application inside or outside of the vehicle using wireless user communications devices 406 to navigate among and locate desirable media content.

It will be appreciated that while the discussion of media content has focused on video content, the principles of media guidance can be applied to other types of media content, such as Text, graphical images (e.g., cover art, still images from the media content, video clip previews, live video from the media content, other types of media that indicate to a user the media content being described by the listing, or any combination thereof), audio (e.g., music, spoken word, etc.), any other suitable content, or any combination thereof to describe media content.

In some embodiments of the present invention, the media guidance application may be at least partially used in user equipment devices 404, 406, or both that are located in a vehicle 402. In some embodiments, user equipment 404 may be located outside of vehicle 402 whereas user device 406 may be located within a vehicle 402 carried as a portable device on a user's person.

As the user travels (either in a vehicle 402 or in any other suitable way, such as on foot), user device 406 may use its location detection capabilities to determine its current geographic location. The current geographic location may be periodically and automatically updated according to a software routine running on the user device and/or distribution equipment. The current geographic location may be updated in response to a user-initiated command to have it updated.

Information regarding the geographic location of user device 406, may be communicated to distribution facility 416 via, for example, communications network 414 or by any other suitable communications path and network. The geographic location information of user device 406 may include any suitable information that indicates a geographic location where user device 406 is. For example, the information may include, longitude and latitude data, altitude data, an address (in whole or in part), a zip code, a building name, a region, a neighborhood, a district, a county, a country, a city, a state, a business name, a school, any other suitable information, or any combination thereof.

In some embodiments, the geographic location information may be automatically communicated to distribution facility 416 every time the location information changes. In some embodiments, the geographic information may be automatically communicated to distribution facility 416 on a periodic basis. In some embodiments, the geographic location information may be communicated to distribution facility 416 in response to a user-initiated command.

Distribution facility 416 may store and update the received geographic information in a database (not shown). The geographic information may be associated at distribution facility 416 with the user device from which the information originated.

In some embodiments, associations between media content and/or media content listings may be predefined and stored in a database located at, for example, a distribution facility. These associations may also be generated at the user equipment, distribution facility, at any other suitable location, or any combination thereof based on, for example, information provided by users. In some embodiments, the database may contain fields for content, location, associations (e.g., metadata), any other suitable field, or any combination thereof. The associations may be stored as, for example, metadata as part of the media content itself, as part of the corresponding content listing, or both.

In some embodiments, the geographic location information of a user equipment device may be associated with media content or media content listings. The associations may be used, for example, to provide users in various geographic locations with associated media content, media content listings, or both. Media content and media content listings associated with a particular geographic location may be provided on user equipment as, for example, a list of points of interest or a map showing points of interest in or around the geographic location. In some embodiments, media content listings may be provided according to, for example, popularity of the underlying content in or around the geographic location. In some embodiments, the displayed points of interest, media content listings, or both may direct the user to the referenced media content. For example a point of interest listing or tag on a map may link to a video scene filmed at that geographic location.

Various embodiments of the present invention will now be discussed in reference to FIGS. 5-12.

Figure 5:
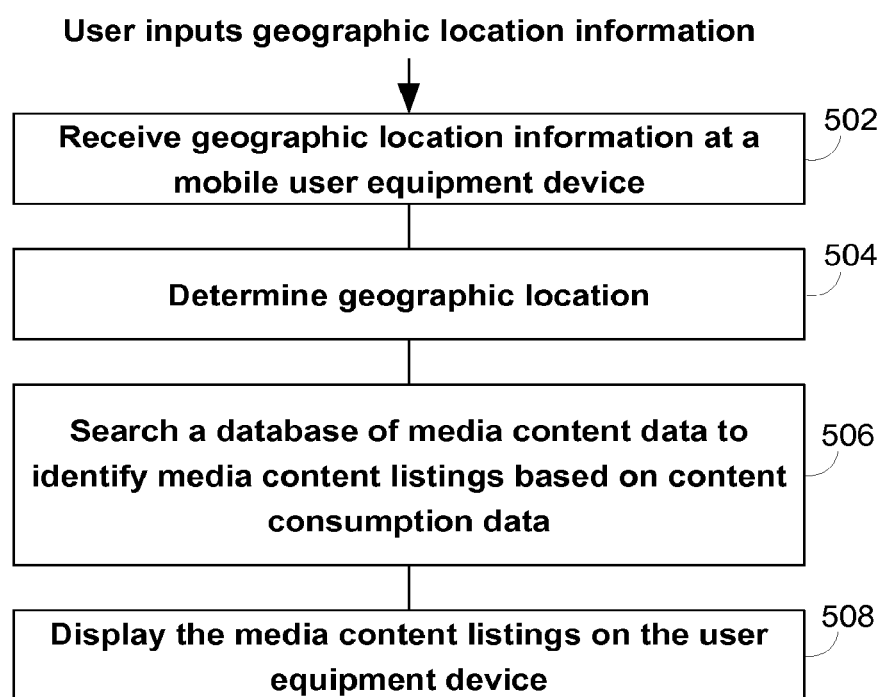
FIG. 5 shows a flow chart of illustrative steps involved in providing media content listings on a user equipment device located at a geographic location in accordance with some embodiments.

FIG. 5 is a flow chart of illustrative steps involved in providing media content listings on a user equipment device located at a geographic location in accordance with some embodiments of the present invention. At step 502, the user equipment device (e.g., user computer equipment 404, wireless user communications device 406, any other suitable user equipment device, or any combination thereof), distribution facility 416, or both may receive geographic location information. The geographic location information, for example, may be a travel destination. In some embodiments, the geographic location information may have been generated by a location detection module in the user equipment device (or as part of an installation 402 where the user equipment device is located, such as a vehicle). User equipment devices, distribution equipment, or both may receive the geographic location information through any suitable communications path and/or network in accordance with some embodiments of the present invention.

At step 504, the geographic location of the user equipment may be determined by electronic processing equipment 438 at least partially implemented at distribution facility 416. Electronic processing equipment may be any suitable software, hardware, or both that is capable of performing any of the processing steps of the present invention. Electronic processing equipment may be at least partially implemented in distribution facility 416, installation 402, positioning equipment 442, any other suitable location, or any combination thereof.

At step 506, a database of media content data (e.g., database 432, 434, 436, any other suitable database, or any combination thereof) may be searched to identify media content listings based on content consumption data related to other mobile user equipment devices used by others not from the vicinity of the geographic location. Content consumption data may be, for example, based on the number of times the content has been accessed by other mobile user equipment devices used by others who are from geographic locations in the vicinity of where the user is from. In some embodiments, content consumption data may be generated by monitoring interactions of the users with the other mobile user equipment devices. In some embodiments, the content consumption data may be updated in real-time (e.g., the updating is based on real-time clickstream data associated with the other mobile user equipment devices, etc.).

The media guidance application may provide media content listings in the geographic region of a user's geographic location based on content consumed by travelers to the geographic region who may originate from geographic locations near the user's origination location. In some embodiments, the media guidance application may provide media content listings for popular content consumed in the geographic region of a user's destination. For example, if a user originates from San Francisco, Calif., and is traveling to London, England, the media guidance application may provide media content listings for popular content consumed in London (or in England or Europe, etc.) by travelers originating from San Francisco (or from California or the United States, etc.). In some embodiments, the distribution facility 416 may record what content a user equipment device is consuming, the geographic location of the user equipment device, the origination location of the user equipment device (e.g., using user preferences, etc.), any other suitable information, or any combination thereof to update the database of media content data (e.g., a database to be accessed by a traveler's user equipment device, etc.).

In some embodiments, media content listings may be based at least in part on user input (e.g., the user indicates a desire for a listing of television content, movie content, radio content, web content, any other suitable content, or any combination thereof) communicated through any suitable communications path and/or network in accordance with some embodiments of the present invention. In some embodiments, media content listings may be based at least in part on user preference information (e.g., user equipment device preferences, user equipment device history, a plurality of user equipment device preferences, a plurality of equipment access device histories, any other suitable information, or any combination thereof). In some embodiments, the one or more media content listings may be communicated to the user equipment through communications network 414 or any other suitable communications network or path in accordance with some embodiments of the present invention.

At step 508, the one or more media content listings may be displayed on one or more user equipment devices (e.g., by the guidance application) using a display screen. In some embodiments, the displayed media content listing may direct the user to the referenced media content (e.g., a media content listing uses a hyperlink to the most popular video near the geographic location, the second most popular radio station near the geographic location, a popular local news article describing an event that occurred near the geographic location, etc.).

In some embodiments, the geographic location information may be updated at any suitable point, such as after step 508. This may result in receiving updated geographic location information from a user equipment device, determining updated geographic location, identifying one or more updated media content listings based on content consumption data in the geographic region, communicating the one or more updated media content listings to the user equipment device, and displaying the one or more updated media content listings on the user access device. In some embodiments, the content consumption data may be updated at any suitable point, such as after step 508. The process shown in FIG. 5 may use the updated geographic location information, updated content consumption data, or both to provide one or more updated media content listings to the user equipment device.

In some embodiments, content consumption data may be based at least in part on data collected from one or more user equipment devices in the vicinity of the geographic location (e.g., a media content listing may be based at least in part on content consumed by geographic neighbors during any suitable time interval). The process shown in FIG. 5 may be configured to provide streaming and/or real-time media content listings. Using the location detection module and submission of real-time clickstream data, for example, the distribution facility may provide recommendations for what content other users near the geographic location of the user equipment device are consuming by popularity. In some embodiments, the distribution facility may provide lists of what users travelling to a certain destination usually consume for content and/or see what type of content is consumed most in a particular geographic area. When the content is displayed on the user access device, for example, the distribution facility may collect information about what content has been displayed and how many times it has been displayed. This may also be used for any content (e.g., programs, movies, etc.) that is delivered streaming over the air to an installation (e.g., vehicle, car, plane, boat, any other suitable installation, or any combination thereof).

Figure 6:
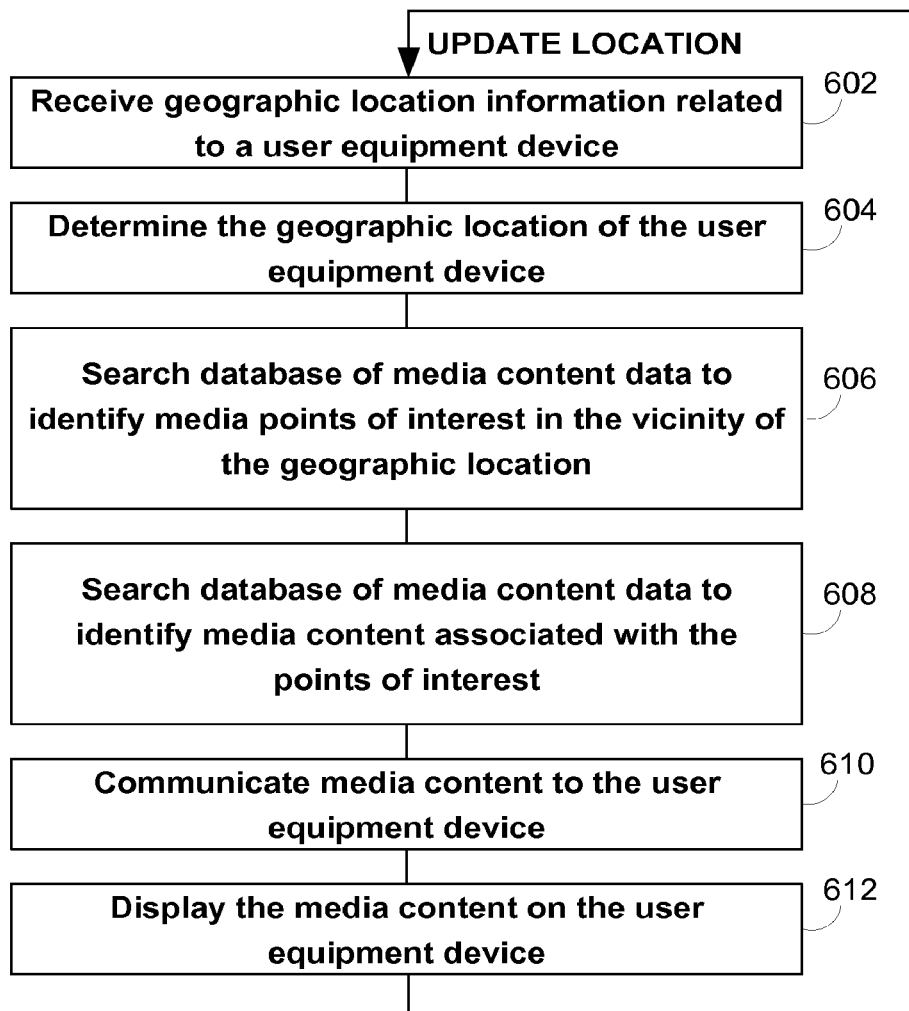
FIG. 6 shows a flow chart of illustrative steps involved in providing points of interest based on geographic location to a user equipment device in accordance with some embodiments.

FIG. 6 is a flow chart of illustrative steps involved in providing points of interest based on geographic location to a user equipment device in accordance with some embodiments of the present invention. At step 602, distribution facility 416 may receive geographic location information from a user equipment device (e.g., user equipment device 404, 406, any other suitable device, or any combination thereof). At step 604, the geographic location of the user equipment may be determined by the electronic processing equipment in accordance with some embodiments of the present invention.

At step 606, a database of media content data (e.g., database 432, 434, 436, any other suitable database, or any combination thereof) may be searched to identify media points of interest in the vicinity of the geographic location. In some embodiments, media points of interest may be based in part on user input (e.g., the user indicates a desire for specific media content associated with the geographic location, etc.) communicated, for example, through communications network 414. In some embodiments, media content data may be updated by data collected from a user or multiple users. In some embodiments, media points of interest associated with the geographic location may be based in part on user preference information (e.g., user equipment device preferences, user equipment device history, a plurality of user equipment device preferences, a plurality of equipment access device histories, any other suitable information, or any combination thereof).

At step 608, a database of media content data (e.g., database 432, 434, 436, any other suitable database, or any combination thereof) may be searched to identify media content (e.g., video, audio, text, bibliographic data, biographic data, metadata, any other suitable content, or any combination thereof) associated with the points of interest. At step 610, the media content data may be communicated to the user equipment through any suitable communications path and/or network in accordance with some embodiments of the present invention. At step 612, the media content may be displayed on one or more user equipment devices (e.g., by the guidance application, any other suitable application, or both) using a display screen. The media content may be displayed as a list (e.g., points of interest near the geographic location), as a map (e.g., physical locations of points of interest near the geographic location), as any other suitable configuration, or any combination thereof. In some embodiments, the displayed points of interest may direct the user to the referenced media content (e.g., a point of interest uses a hyperlink to a video scene filmed at the point of interest, a business featured in a television program, a news article describing an event that occurred near the geographic location, etc.).

In some embodiments, the geographic location information may be updated at any suitable point in the process, such as after step 612. This may result in receiving updated geographic location information from a user equipment device, determining updated geographic location, identifying updated media content associated with the geographic region, communicating the updated media content to the user equipment device, and displaying the updated media content on the user access device. In some embodiments, the media content data may be updated at any suitable point, such as after step 608, in accordance with some embodiments of the present invention. The process shown in FIG. 6 may use the updated geographic location information, updated media content data, or both to provide updated media content to the user equipment device. The user equipment device and/or distribution facility may tag locations in a database of movie metadata such that, for example, via the user equipment device a user can lookup where a particular scene in a movie was shot or which movies used a particular location to film a scene. The process shown in FIG. 6 may be configured to provide streaming and/or real-time media content listings.

Figure 7:
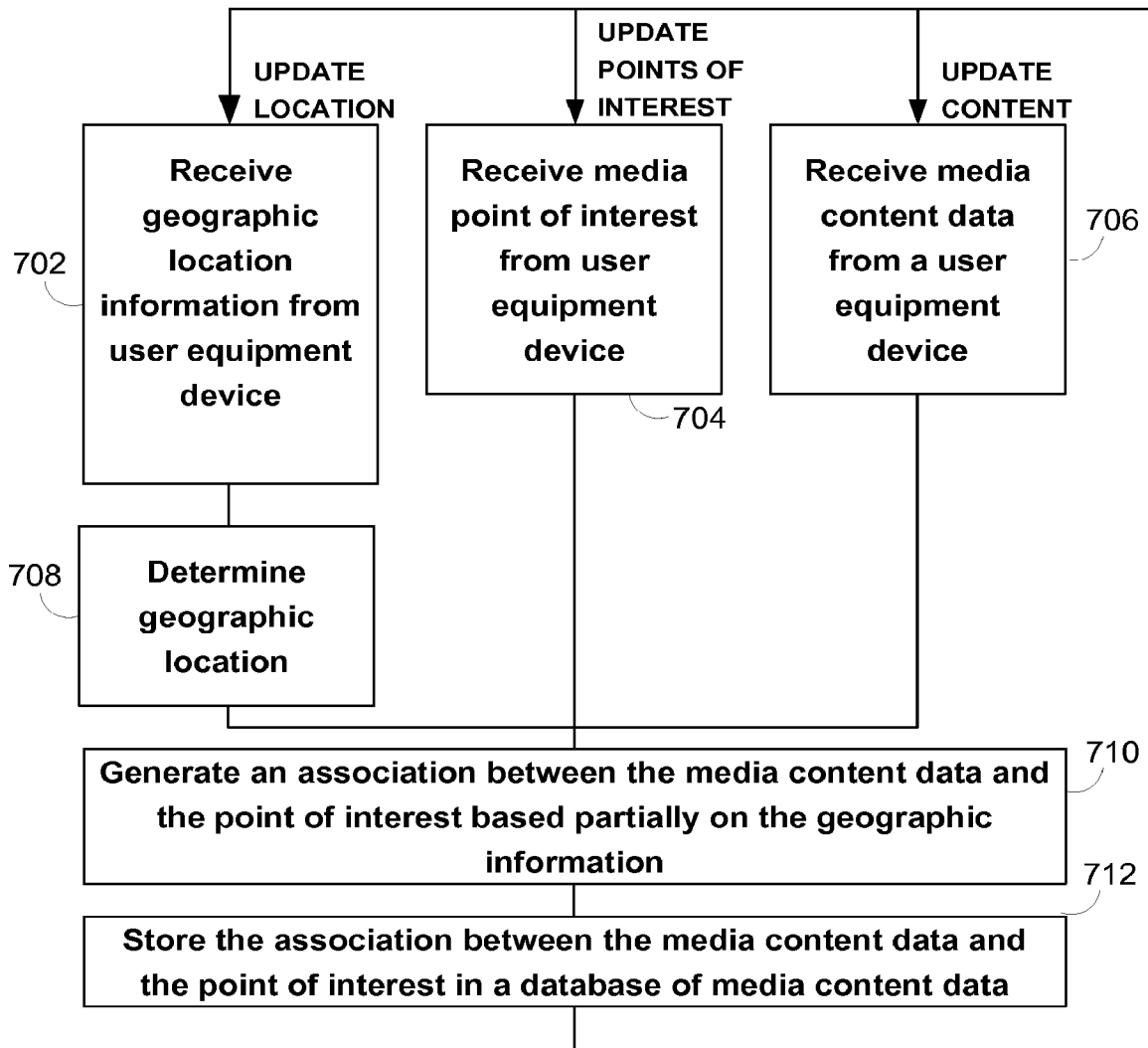
FIG. 7 shows a flow chart of illustrative steps involved in updating a database of points of interest in accordance with some embodiments.

FIG. 7 is a flow chart of illustrative steps involved in updating a database of points of interest in accordance with some embodiments of the present invention. At step 702, distribution facility 416 may receive geographic location information from a user equipment device (e.g., user equipment device 404, 406, any other suitable device, or any combination thereof), in accordance with some embodiments of the present invention. At step 708, the electronic processing equipment may determine the geographic location of the user equipment in accordance with some embodiments of the present invention.

At step 704, distribution facility 416 may receive media points of interest in the vicinity of the geographic location in accordance with some embodiments of the present invention. At step 706, distribution facility 416 may receive media content data from a user equipment device in accordance with some embodiments of the present invention. Media points of interest, media content data, any other suitable data, or any combination thereof may be provided by a user through a user input interface (e.g., a remote control, mouse, trackball, keypad, keyboard, touch screen, touch pad, stylus input, joystick, voice recognition interface, any other suitable user input interface, or any combination thereof), by a user equipment device through a guidance application (e.g., monitoring location and media content consumption on a user equipment device), by any other suitable source, or any combination thereof. In some embodiments, media points of interest, media content data, any other suitable data, or any combination thereof may be based in part on user input (e.g., the user indicates a desire to associate specific media content with the geographic location, etc.) communicated through communications network 414. In some embodiments, media points of interest, media content data, any other suitable data, or any combination thereof may be based in part on data collected from a user or multiple users. In some embodiments, media points of interest, media content data, any other suitable data, or any combination thereof may be based in part on user preference information (e.g., user equipment device preferences, user equipment device history, a plurality of user equipment device preferences, a plurality of equipment access device histories, any other suitable information, or any combination thereof). In some embodiments, distribution equipment may receive the media points of interest, media content data, any other suitable data, or any combination thereof through any suitable communications paths and/or network in accordance with some embodiments of the present invention. The media points of interest, media content data, any other suitable data, or any combination thereof may be input by a user on one or more user equipment devices (e.g., by the guidance application, any other suitable application, or both) in accordance with some embodiments of the present invention.

At step 710, an association between the media content data and the point of interest may be generated. At step 712, the media content data, the point of interest, the association, any other suitable data, or any combination thereof may be stored in the database of media content data (e.g., database 432, 434, 436, any other suitable database, or any combination thereof).

In some embodiments, the geographic location information, points of interest, media content data, any other suitable information, or any combination thereof may be updated at any suitable point in the process, such as after step 712. This may result in receiving updated geographic location information, points of interest, media content data, any other suitable information, or any combination thereof from a user equipment device, determining updated geographic location, generating updated associations between the updated geographic location, points of interest, media content data, any other suitable information, or any combination thereof and storing the updated points of interest, the updated media content data, the updated geographic location, the updated association, any other suitable data, or any combination thereof in the database of media content data in accordance with some embodiments of the present invention. The process shown in FIG. 7 may be configured to provide streaming and/or real-time media content listings.

Figure 8:
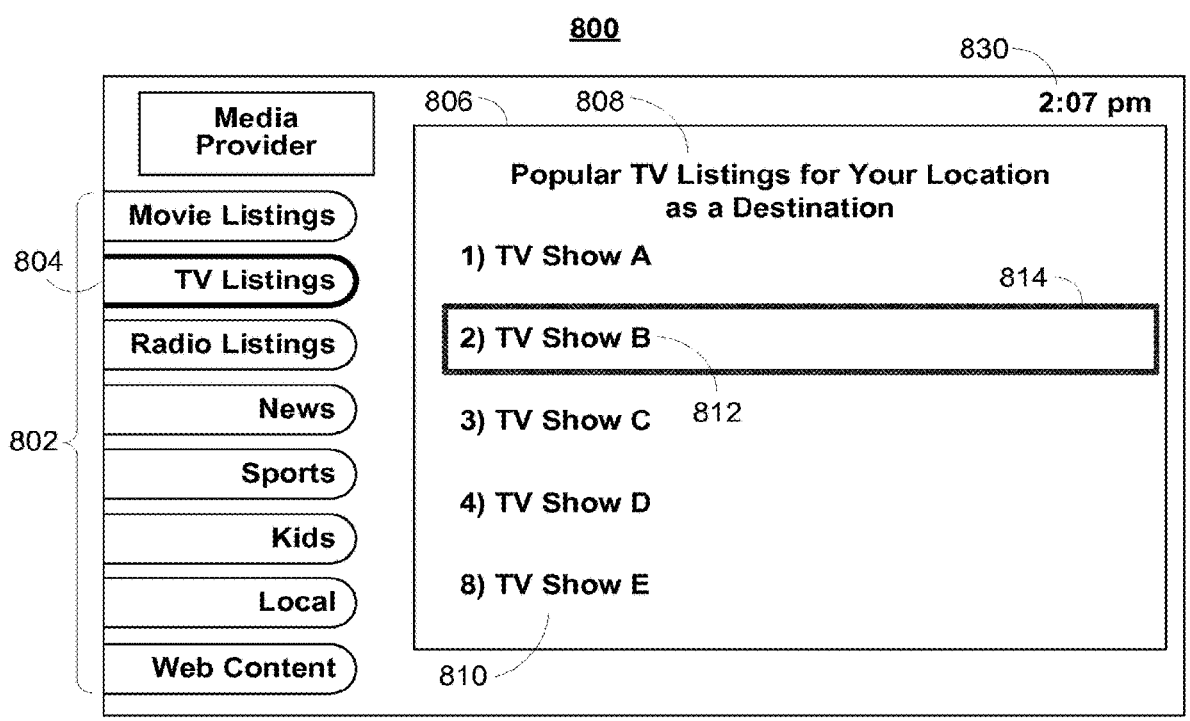
FIG. 8 shows an illustrative media application guide display screen for displaying media content listings in accordance with some embodiments.

FIG. 8 shows an illustrative media application guide display screen 800 for displaying media content listings in accordance with some embodiments. Display screen 800 may enable access to various types of media content in a single display, a single screen overlay, multiple displays, multiple screen overlays, any other suitable display, or any combination thereof and may or may not be updated at any suitable time interval (e.g., streaming, real-time, etc.) defined by the user, user equipment device, guidance application, distribution facility, any other suitable means, or any combination thereof. Display screen 800 may include selectable options 802 for media content information organized based on media type, genre, any other organization criteria, or any combination thereof. In some embodiments, selectable options 802 may provide options for linear and/or non-linear media content including movie content, television content, radio content, news content, sports content, children's content, Internet content, on-demand content (e.g., VOD), local content (e.g., traveler information), locally-stored content, geographic content, any other suitable content, or any combination thereof. In some embodiments, a user may use a user input device to select one or more types of media content (e.g., one or more of selectable options 802, any other suitable selection, or any combination thereof) to display in display region 806. In display screen 800, selectable option 804 (e.g., movie listings option, television listings option, radio listings option, any other suitable option, or any combination thereof) may be selected and may provide media content listings 810 in display region 806. Media content listings 810 may be accompanied by media content listings header 808 (e.g., "Popular TV Listings for Your Location as a Destination", etc.), which may describe the scope of the displayed media content listings. In some embodiments, media content listings 810 may provide listings for linear and/or non-linear media content in accordance with some embodiments of the present invention. Display screen 800 may also comprise informational header 830, which may be used to display date, time, location, any other suitable information, or any combination thereof.

In some embodiments, the media content listings 810 in display screen 800 may provide text (e.g., the content title), icons, graphical images (e.g., cover art, still images from the media content, video clip previews, live video from the media content, other types of media that indicate to a user the media content being described by the listing, or any combination thereof), audio, any other suitable content, or any combination thereof to describe media content. In some embodiments, one or more of the graphical listings may be accompanied by text to provide further information about the media content associated with the media content listing. In some embodiments, media content listing 812 in selectable region 814 may include one or more portions (e.g., one or more media portions, one or more text portions, or both), which may be individually selectable to view to view media content and/or media content listings related to media content listings 810 (e.g., to view listings for a channel associated with a video) in display region 806, in full-screen, and/or in an additional screen and/or screen overlay.

In some embodiments, the media content listings 810 and media content listings header 808 in display screen 800 may be of the same, similar, and/or different sizes (i.e., listing 812 is larger than other content listings in display region 806), graphically accentuated, formatted in any other suitable manner, or any combination thereof to indicate degrees of interest to the user and/or to emphasize certain content, such as content desired by the media provider or based on user preferences.

In some embodiments, information or media content relating to the media content listing 812 may be provided in display region 806, in an alternate screen and/or screen overlay, or both. Region 806 may include, for example, one or more content titles, one or more content descriptions, the time the one or more content is provided, the channel the one or more content is on, the one or more content's local, national and/or global popularity, any other desired information, or any combination thereof.

In some embodiments, a user may use a user input device to select one or more media content listings, such as media content listing 812, by moving selectable region 814, scrolling to the desired media content listing, touching a touchscreen, using any other suitable method for selecting content, or using any combination thereof. In some embodiments, the displayed media content listing 812 may direct the user to the referenced media content (e.g., a media content listing uses a hyperlink to the most popular video near the geographic location, the second most popular radio station near the geographic location, a popular local news article describing an event that occurred near the geographic location, etc.).

In some embodiments, display screen 800 may also include one or more video regions, one or more advertisements, one or more options regions, any other suitable display region, or any combination thereof. The content of a video region, for example, may correspond to, or be independent from, one or more of the media content listings displayed in display region 806. Displays including a video region are sometimes referred to as picture-in-guide (PIG) displays. PIG displays may be included in other media guidance application display screens of the present invention. It will be appreciated that one or more video regions may be included in other media guidance application display screens of the present invention.

In some embodiments, an advertisement displayed in display screen 800 may provide an advertisement for media content that, depending on a viewer's access rights (e.g., for subscription media content), is currently available for viewing, will be available for viewing in the future, or may never become available for viewing, and may correspond to or be unrelated to one or more of the media content listings 810, selectable options 802, any other suitable information, or any combination thereof. An advertisement may also be for products or services related or unrelated to the media content listings 810. An advertisement may be selectable and provide further information about media content, provide information about a product or a service, enable purchasing of media content, a product, or a service, provide media content relating to the advertisement, perform any other suitable function, or any combination thereof. Advertisement 424 may be targeted based on a user's profile/preferences, monitored user activity, the type of display provided, or on other suitable targeted advertisement bases. An advertisement may be provided in any suitable size, shape, and location in a guidance application display. For example, an advertisement may be provided as a rectangular shape that is horizontally or vertically adjacent to display region 806. In some embodiments, advertisements may be overlaid over media content or a guidance application display or embedded within a display. Advertisements may also include text, images, rotating images, video clips, any other suitable types of media content, or any combination thereof. Advertisements may be stored in the user equipment with the guidance application, in a database connected to the user equipment (e.g., a distribution facility, a media content source, a media guidance content source, any other suitable database, or any combination thereof), in a remote location (including streaming media servers), on any other suitable storage means, or any combination thereof. It will be appreciated that advertisements may be included in other media guidance application display screens of the present invention.

In some embodiments, an options region may allow the user to access different types of media content, media guidance application displays, and/or media guidance application features. An options region may be part of display screen 800 and/or other display screens of the present invention, or may be invoked by a user by selecting an on-screen option or pressing a dedicated or assignable button on a user input device. The options region may concern features related to media content listings in display region 806 or may include options available from a main menu display. Features related to media content listings may include searching for other air times or ways of receiving media content, recording media content, enabling series recording of media content, setting media content and/or channel as a favorite, purchasing media content, any other suitable features, or any combination thereof. In some embodiments, options available from a main menu display may include search options, VOD options, parental control options, access to various types of listing displays, subscribe to a premium service, edit a user's profile, access a browse overlay, any other suitable options, or any combination thereof.

Figure 9:
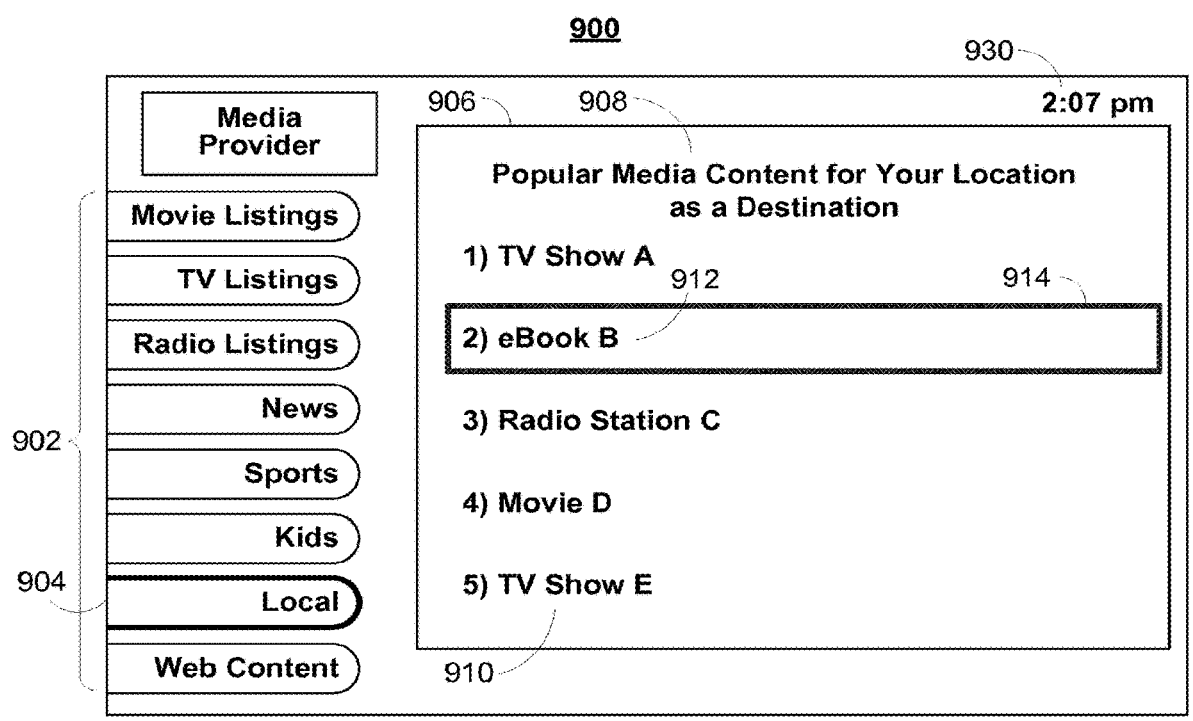
FIG. 9 shows an illustrative media application guide display screen for displaying mixed media content listings in accordance with some embodiments.

FIG. 9 shows an illustrative media application guide display screen 900 for displaying mixed media content listings in accordance with some embodiments of the present invention. Display screen 900 may enable access to various types of media content in a single display, a single screen overlay, multiple displays, multiple screen overlays, any other suitable display, or any combination thereof and may or may not be updated at any suitable time interval (e.g., streaming, real-time, etc.) defined by the user, user equipment device, guidance application, distribution facility, any other suitable means, or any combination thereof. A display combining listings for content from different types of media sources is sometimes referred to as a "mixed-media" display.

Display screen 900 may include selectable options 902 for media content information in accordance with some embodiments of the present disclosure. In some embodiments, a user may use a user input device to select one or more types of media content (e.g., one or more of selectable options 902, any other suitable selection, or any combination thereof) to display in display region 906. In display screen 900, selectable option 904 (e.g., local listings option, etc.) may be selected and may provide media content listings 910 in display region 906. Media content listings 910 may be accompanied by media content listings header 908 (e.g., "Popular Media Content for Your Location as a Destination", etc.), which may describe the scope of the displayed media content listings 910.

In some embodiments, media content listing 910 may provide listings for linear and/or non-linear media content in accordance with some embodiments of the present invention. Display screen 900 may also comprise informational header 930, which may be used to display date, time, location, any other suitable information, or any combination thereof. In some embodiments, the various permutations of the types of listings that may be displayed that are different than display 900 may be based on user selection or guidance application definition (e.g., a display of only movie and radio listings, only news and Internet content listings, etc.).

In some embodiments, the media content listings 910 in display screen 900 may provide text (e.g., the content title), icons, graphical images (e.g., cover art, still images from the media content, video clip previews, live video from the media content, other types of media that indicate to a user the media content being described by the listing, or any combination thereof), audio, any other suitable content, or any combination thereof to describe media content. In some embodiments, one or more of the graphical listings may be accompanied by text to provide further information about the media content associated with the media content listing. In some embodiments, media content listing 912 in selectable region 914 may include one or more portions, which may be individually selectable to view media content in accordance with some embodiments of the present invention.

In some embodiments, the media content listings 910 and media content listings header 908 in display screen 900 may emphasize certain content in accordance with some embodiments of the present invention. Information or media content relating to the media content listing 912 may be provided in display region 906, in an alternate screen and/or screen overlay, or both. A user may select one or more media content listings in accordance with some embodiments of the present invention. The displayed media content listing 912 may direct the user to the referenced media content, other media content, and/or additional listings in accordance with some embodiments of the present invention.

In some embodiments, a user may access additional listings in accordance with some embodiments of the present invention. In some embodiments, display screen 900 may also include one or more video regions, one or more advertisements, one or more options regions, any other suitable display region, or any combination thereof and/or may be personalized in accordance with some embodiments of the present invention.

Figure 10:
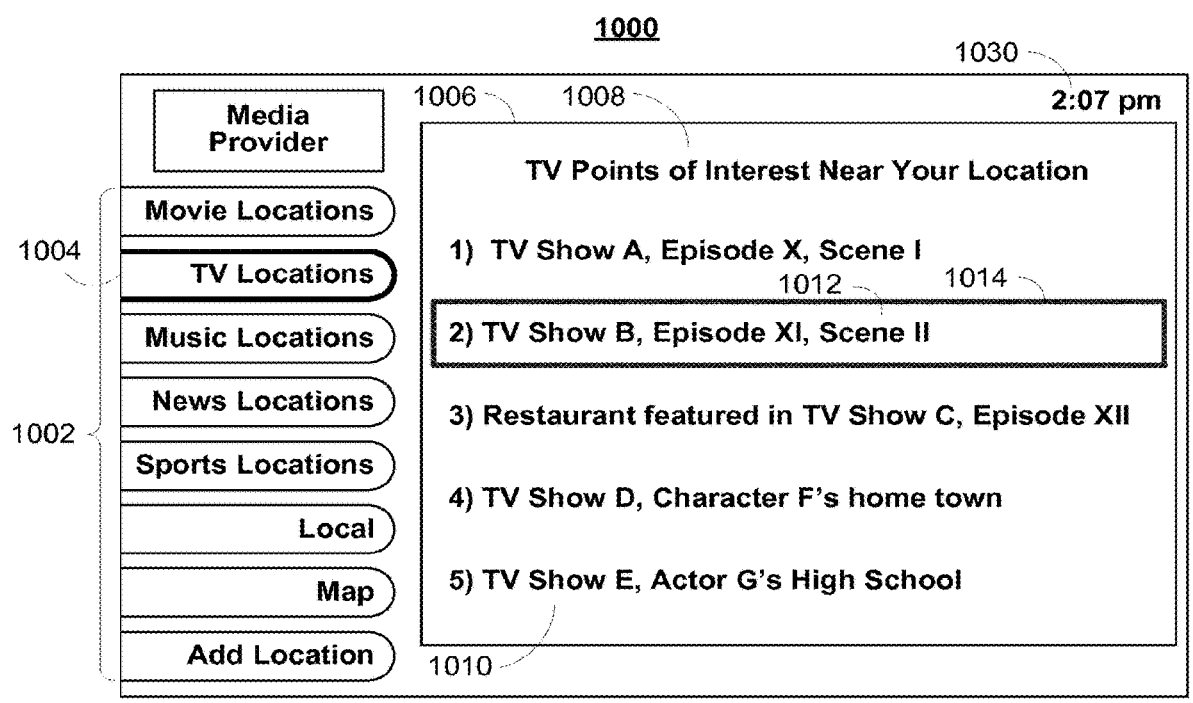
FIG. 10 shows an illustrative media application guide display screen for displaying points of interest based on geographic location in accordance with some embodiments.

FIG. 10 shows an illustrative media application guide display screen 1000 for displaying points of interest based on geographic location in accordance with some embodiments of the present invention. Display screen 1000 may enable access to various types of media content associated with a geographic location in a single display, a single screen overlay, multiple displays, multiple screen overlays, any other suitable display, or any combination thereof and may or may not be updated at any suitable time interval (e.g., streaming, real-time, etc.) defined by the user, user equipment device, guidance application, distribution facility, any other suitable means, or any combination thereof.

Display screen 1000 may include selectable options 1002 for media content information in accordance with some embodiments of the present disclosure. In some embodiments, a user may use a user input device to select one or more types of media content to display in display region 1006. In display screen 1000, selectable option 1004 (e.g., television locations option, etc.) may be selected and may provide media content 1010 in display region 1006. Media content 1010 may be accompanied by media content header 1008 (e.g., "TV Points of Interest Near Your Location", etc.), which may describe the scope of the displayed media content 1010.

In some embodiments, media content 1010 may provide media content and/or listings for locations associated with linear and/or non-linear media content in accordance with some embodiments of the present invention. Display screen 1000 may also comprise informational header 1030, which may be used to display date, time, location, any other suitable information, or any combination thereof. In some embodiments, the various permutations of the types of media content and/or listings that may be displayed that are different than display 1000 may be based on user selection or guidance application definition (e.g., a display of only movie and radio content, only news and Internet content, etc.).

In some embodiments, media content 1010 in display screen 1000 may provide text (e.g., the content title), icons, graphical images (e.g., cover art, still images from the media content, video clip previews, live video from the media content, other types of media that indicate to a user the media content being described by the content and/or listing, or any combination thereof), audio, any other suitable content, or any combination thereof to describe media content. In some embodiments, one or more of the graphical images may be accompanied by text to provide further information about the media content associated with the geographic location. In some embodiments, media content 1012 in selectable region 1014 may include one or more individually selectable portions to view media content related to media content 1010 and/or geographic location in accordance with some embodiments of the present invention.

In some embodiments, the media content listings 1010 and media content listings header 1008 in display screen 1000 may emphasize certain content in accordance with some embodiments of the present invention. Information or media content relating to the media content listing 1012 may be provided in display region 1006, in an alternate screen and/or screen overlay, or both. A user may select one or more media content listings in accordance with some embodiments of the present invention. The displayed media content listing 1012 may direct the user to the referenced media content, other media content, and/or additional listings in accordance with some embodiments of the present invention. In some embodiments, the displayed media content 1010 may direct the user to a map showing the geographic location of the media content, the user, or both (e.g., as discussed below in accordance with some embodiments of the present invention).

In some embodiments, a user may access additional media content in accordance with some embodiments of the present invention. In some embodiments, display screen 1000 may also include one or more video regions, one or more advertisements, one or more options regions, any other suitable display region, or any combination thereof and/or may be personalized in accordance with some embodiments of the present invention.

Figure 11:
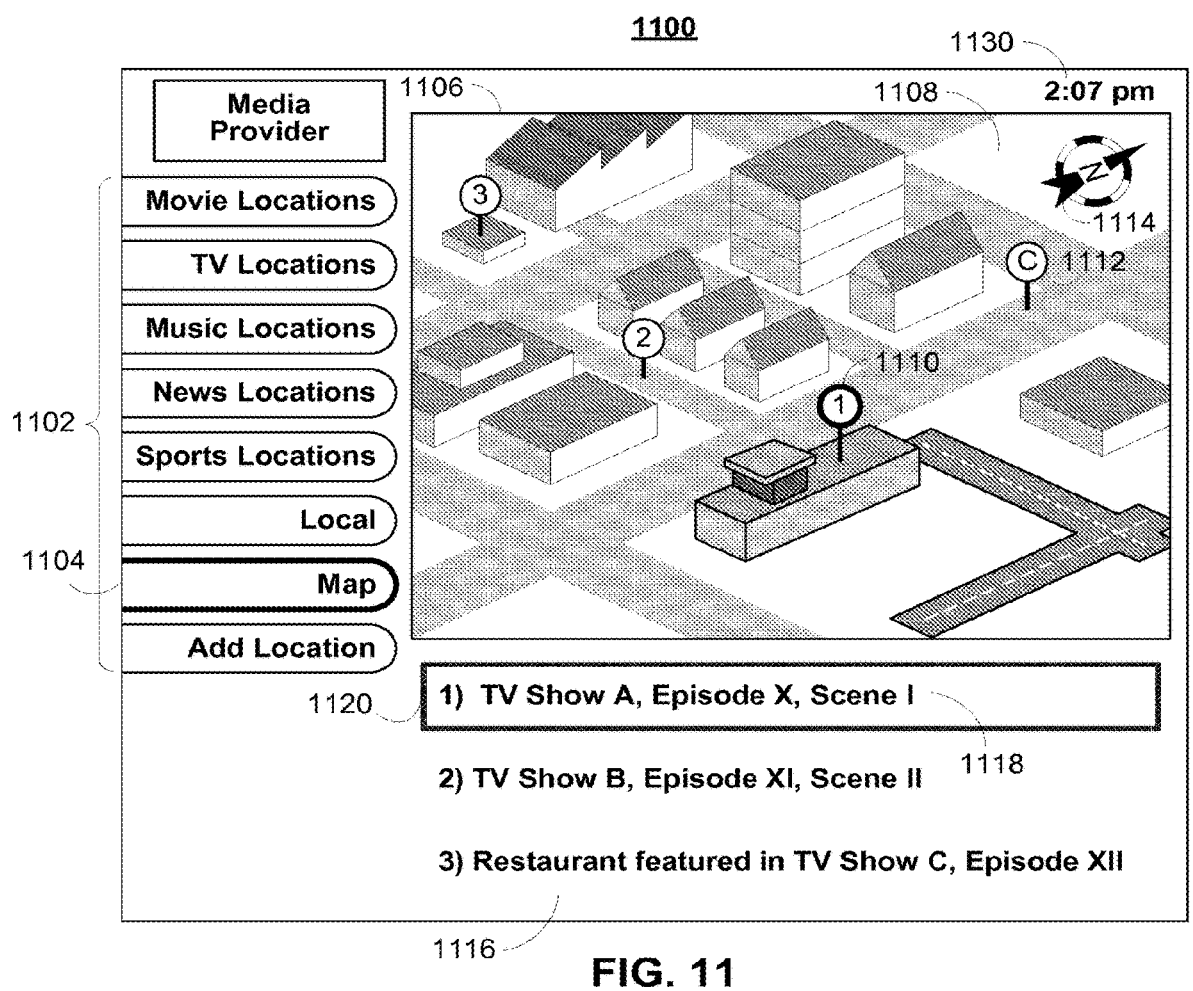
FIG. 11 shows an illustrative media application guide display screen for displaying points of interest based on geographic location in accordance with some embodiments.

FIG. 11 shows an illustrative media application guide display screen 1100 for displaying points of interest based on geographic location in accordance with some embodiments of the present invention. Display screen 1100 may enable access to various types of media content associated with one or more geographic locations in a single display, a single screen overlay, multiple displays, multiple screen overlays, any other suitable display, or any combination thereof and may or may not be updated at any suitable time interval (e.g., streaming, real-time, etc.) defined by the user, user equipment device, guidance application, distribution facility, any other suitable means, or any combination thereof.

Display screen 1100 may include selectable options 1102 for media content information in accordance with some embodiments of the present disclosure. In some embodiments, a user may use a user input device to select one or more types of media content to display in display region 1106.

In display screen 1100, selectable option 1104 (e.g., "Map", etc.) may be selected and may provide one or more maps 1108 to display the geographic locations 1110 of media content 1116 (e.g., the filming location of a scene in a television program, etc.) in display region 1106, the location of user equipment device 1112, a location and/or media content input by the user, user equipment device, guidance application, and/or distribution facility, any other suitable information, or any combination thereof. In some embodiments, map 1108 may include buildings, roads, navigational information 1114 (e.g., a compass, directional arrows, directions, any other suitable information, or any combination thereof). In some embodiments, map 1108 may display geographic content in planar view (e.g., top view), perspective view, satellite view, street view, any other suitable view, or any combination thereof and may or may not comprise road and/or building overlays. In some embodiments, display region 1106 may include an informational header, which may describe the scope of the displayed media content 1116.

In some embodiments, media content 1116 may provide media content and/or listings for locations associated with linear and/or non-linear media content in accordance with some embodiments of the present invention. Display screen 1100 may also comprise informational header 1130, which may be used to display date, time, location, any other suitable information, or any combination thereof. In some embodiments, the various permutations of the types of media content and/or listings that may be displayed that are different than display 1100 may be based on user selection or guidance application definition (e.g., a display of only movie and radio content, only news and Internet content, etc.).

In some embodiments, display region 1106, map 1108, and/or media content 1116 in display screen 1100 may provide text (e.g., the content title), icons, graphical images (e.g., cover art, still images from the media content, video clip previews, live video from the media content, other types of media that indicate to a user the media content being described by the content and/or listing, or any combination thereof), audio, any other suitable content, or any combination thereof to describe media content. In some embodiments, one or more of the graphical images may be accompanied by text to provide further information about the media content associated with the geographic location. In some embodiments, media content 1118 in selectable region 1120 may include one or more individually selectable portions to view media content related to media content 1116 and/or geographic locations 1110 in accordance with some embodiments of the present invention.

In some embodiments, media content 1116, geographic locations 1110, and/or any other suitable content in display screen 1100 may be of the same, similar, and/or different sizes, graphically accentuated, formatted in any other suitable manner, or any combination thereof to indicate degrees of interest to the user and/or to emphasize certain content, such as content desired by the media provider or based on user preferences. In some embodiments, information or media content relating to media content 1116 and/or geographic locations 1110 may be provided in display region 1106, in an alternate display region of display screen 1100, in an alternate screen and/or screen overlay, or both.

In some embodiments, a user may use a user input device to select one or more media content and/or geographic location, such as media content 1118 and/or geographic location 1110 in accordance with some embodiments of the present invention. In some embodiments, the displayed media content 1116 may direct the user to a map showing the geographic location of the media content, the user, or both. In some embodiments, the displayed media content 1116 may direct the user to the referenced media content (e.g., media content uses a hyperlink to the second closest media content to the geographic location, etc.) and/or to the geographic location 1110 associated with the media content, and/or vice versa. In some embodiments, the media content 1116 and/or geographic location 1110 may direct the user to directions to the geographic location 1110, such as graphic directions, textual directions, audio directions, any other suitable directions, or any combination thereof. In some embodiments, the media guidance application may provide access to linear media content, non-linear media content, any other suitable programming or media content, or any combination thereof. In some embodiments, additional content and/or listings may be displayed in accordance with some embodiments of the present invention.

In some embodiments, a user may access additional media content in accordance with some embodiments of the present invention. In some embodiments, display screen 1100 may also include one or more video regions, one or more advertisements, one or more options regions, any other suitable display region, or any combination thereof and/or may be personalized in accordance with some embodiments of the present invention.

Figure 12:
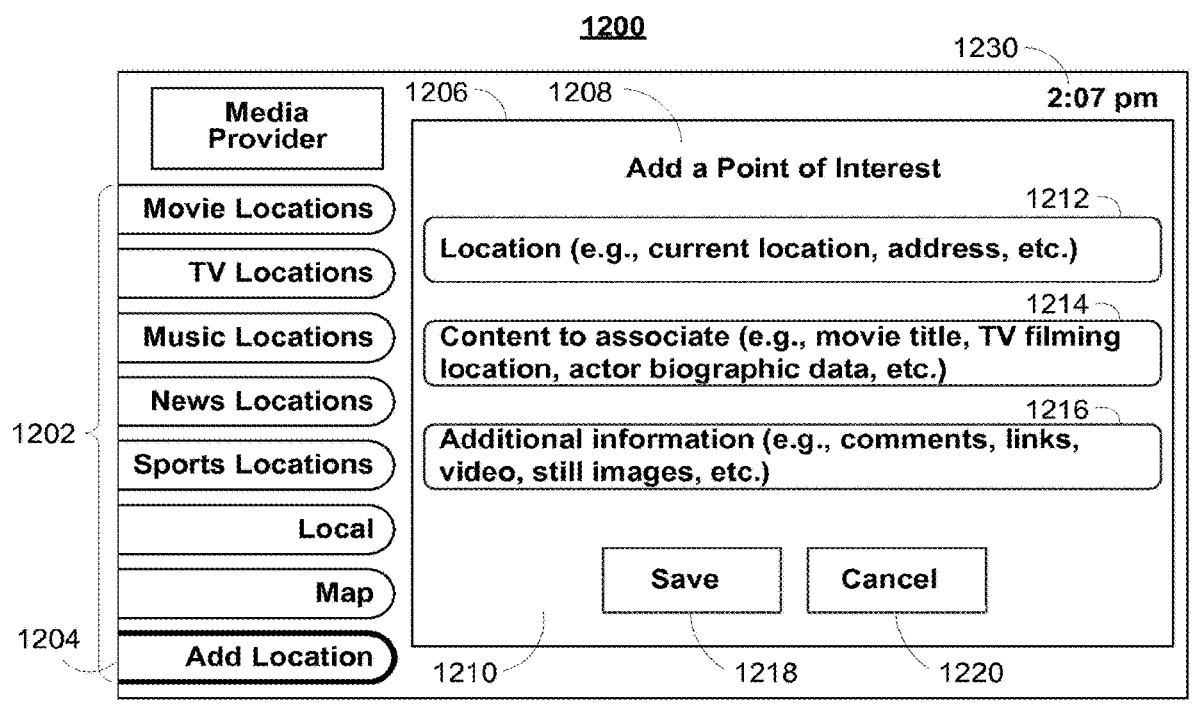
FIG. 12 shows an illustrative media application guide display screen which may be used for updating a database of points of interest in accordance with some embodiments.

FIG. 12 shows an illustrative media application guide display screen 1200 which may be used for updating a database of points of interest in accordance with some embodiments of the present invention. In some embodiments, the database of media content data may be one or more distribution components, included in or separate from a distribution facility, distributed amongst distribution equipment (including geographic and/or virtual locations, etc.), arranged in any other suitable manner, or any combination thereof.

Display screen 1200 may enable access to add and/or update various types of media content, geographic location content, and/or associations thereof in accordance with embodiments of the present invention.

Display screen 1200 may include selectable options 1202 for media content information in accordance with some embodiments of the present disclosure. In some embodiments, a user may use a user input device to select one or more types of media content (e.g., one or more of selectable options 1202, any other suitable selection, or any combination thereof) to display in display region 1206. In display screen 1200, selectable option 1204 (e.g., "add location" option, etc.) may be selected and may provide database updating features 1210 in display region 1206. Database updating features 1210 may be accompanied by media content header 1208 (e.g., "Add a Point of Interest", etc.) and/or individual database updating features 1212 (e.g., location input feature), 1214 (e.g., content input feature, etc.), 1216 (e.g., additional input feature, etc.), 1218 (e.g., save feature, etc.), 1220 (e.g., cancel feature, etc.), any other suitable feature, or any combination thereof.

In some embodiments, database updating features 1210 may allow a user (e.g., one or more users and/or devices, a distribution facility, any other suitable user, or any combination thereof) to add, delete, and/or update media content, geographic location, and/or associations thereof for locations associated with linear and/or non-linear media content in accordance with some embodiments of the present invention. Display screen 1200 may also comprise informational header 1230, which may be used to display date, time, location, any other suitable information, or any combination thereof. In some embodiments, the various permutations of the types of features that may be displayed that are different than display 1200 may be based on user selection or guidance application definition (e.g., a display of a movie with database updating features 1210 arranged as a screen overlay, a display of a map with database updating features 1210 arranged as a screen overlay, any other suitable application, or any combination thereof). In some embodiments, display screen 1200 may be used in a device with a camera (e.g., a smartphone, a digital camera, any other suitable device, or any combination thereof) to facilitate the input of graphic images and/or video.

In some embodiments, database updating features 1210 in display screen 1200 may provide text (e.g., geographic location, instructions, any other suitable text, or any combination thereof), icons, graphical images (e.g., cover art, still images from the media content, video clip previews, live video from the media content, other types of media that indicate to a user the media content being described by the content and/or listing, or any combination thereof), audio, geographic information (e.g., one or more maps and/or map overlays), any other suitable content, or any combination thereof to update one or more media content databases. In some embodiments, one or more of the graphical images may be accompanied by text to provide further information about the media content associated with the geographic location. In some embodiments, database updating features 1210 may include one or more individually selectable portions to input media content, geographic location information, and/or an association thereof in display region 1206, in accordance with some embodiments of the present invention.

A user may select and/or provide input to one or more database updating features 1210 in accordance with some embodiments of the present invention. In some embodiments, additional content and/or listings may be displayed in accordance with some embodiments of the present invention. In some embodiments, a user may input additional information in accordance with some embodiments of the present invention.

In some embodiments, display screen 1200 may also include one or more video regions, one or more advertisements, one or more options regions, any other suitable display region, or any combination thereof and/or may be personalized in accordance with some embodiments of the present invention.

It will be understood that the foregoing is only illustrative of the principles of the disclosure, and that the invention can be practiced by other than the described embodiments, which are presented for purposes of illustration and not of limitation.

What is claimed is:

1. A method for delivering media content, the method comprising:
    at one or more servers:
        causing to be determined, using electronic processing equipment, a geographic location of a user equipment device;
        receiving information indicative of a plurality of media content from a plurality of user equipment devices;
        searching an electronic database of media content data to identify at least one landmark associated with the geographic location, to determine that the at least one landmark does not have a line of sight to the geographic location, and to identify a subset of media content of the plurality of media content that is associated with the at least one landmark, wherein each media content of the subset of media content corresponds to a different video asset;
        identifying a geographic location of the landmark; and
        communicating to the user equipment device data indicative of the subset of media content to the user equipment device and data indicative of the geographic location of the landmark using a communications network.

2. The method of claim 1, wherein causing to be determined the geographic location of the user equipment device comprises receiving geographic location information from the user equipment device.

3. The method of claim 1, further comprising causing the generation of a display at the user equipment device that simultaneously comprises an indication of the geographic location of the landmark and an indication of the subset of media content.

4. The method of claim 3, wherein causing the generation of the display at the user equipment device that simultaneously comprises an indication of the geographic location of the landmark and an indication of the subset of media content is based on a degree of interest in each media content of the subset of media content.

5. The method of claim 3, wherein the display further simultaneously comprises a map associated with the geographic location of the landmark.

6. The method of claim 3, wherein the display further simultaneously comprises an indication of the geographic location of the user equipment device.

7. The method of claim 1, wherein each media content of the subset of media content has been populated into the electronic database based on the information received from the plurality of user equipment devices.

8. A system for delivering media content, the system comprising:
    at one or more servers comprising electronic processing equipment, the electronic processing equipment configured to:
        cause to be determined a geographic location of a user equipment device;
        receive information indicative of a plurality of media content from a plurality of user equipment devices;
        search an electronic database of media content data to identify at least one landmark associated with the geographic location, to determine that the at least one landmark does not have a line of sight to the geographic location, and to identify a subset of media content of the plurality of media content that is associated with the at least one landmark, wherein each media content of the subset of media content corresponds to a different video asset;
        identify a geographic location of the landmark; and
        communicate to the user equipment device data indicative of the subset of media content to the user equipment device and data indicative of the geographic location of the landmark using a communications network.

9. The system of claim 8, wherein the electronic processing equipment is configured to cause to be determined the geographic location of the user equipment device by receiving geographic location information from the user equipment device.

10. The system of claim 8, wherein the electronic processing equipment is further configured to cause the generation of a display at the user equipment device that simultaneously comprises an indication of the geographic location of the landmark and an indication of the subset of media content.

11. The system of claim 10, wherein the electronic processing equipment is configured to cause the generation of the display at the user equipment device that simultaneously comprises an indication of the geographic location of the landmark and an indication of the subset of media content based on a degree of interest in each media content of the subset of media content.

12. The system of claim 10, wherein the display further simultaneously comprises a map associated with the geographic location of the landmark.

13. The system of claim 10, wherein the display further simultaneously comprises an indication of the geographic location of the user equipment device.

14. The system of claim 8, wherein each media content of the subset of media content has been populated into the electronic database based on the information received from the plurality of user equipment devices.

15. A non-transitory computer-readable medium having instructions encoded thereon that when executed by control circuitry performs the method comprising:
at one or more servers:
causing to be determined, using electronic processing equipment, a geographic location of a user equipment device;
receiving information indicative of a plurality of media content from a plurality of user equipment devices;
searching an electronic database of media content data to identify at least one landmark associated with the geographic location, to determine that the at least one landmark does not have a line of sight to the geographic location, and to identify a subset of media content of the plurality of media content that is associated with the at least one landmark, wherein each media content of the subset of media content corresponds to a different video asset;
identifying a geographic location of the landmark;
communicating to the user equipment device data indicative of the subset of media content to the user equipment device and data indicative of the geographic location of the landmark using a communications network.

16. The non-transitory computer-readable medium of claim 15, wherein causing to be determined the geographic location of the user equipment device comprises receiving geographic location information from the user equipment device.

17. The non-transitory computer-readable medium of claim 15 having instructions encoded thereon that when executed by control circuitry performs the method further comprising causing the generation of a display at the user equipment device that simultaneously comprises an indication of the geographic location of the landmark and an indication of the subset of media content.

18. The non-transitory computer-readable medium of claim 17, wherein causing the generation of the display at the user equipment device that simultaneously comprises an indication of the geographic location of the landmark and an indication of the subset of media content is based on a degree of interest in each media content of the subset of media content.

19. The non-transitory computer-readable medium of claim 17, wherein the display further simultaneously comprises a map associated with the geographic location of the landmark.

20. The non-transitory computer-readable medium of claim 17, wherein the display further simultaneously comprises an indication of the geographic location of the user equipment device.

21. The non-transitory computer-readable medium of claim 15, wherein each media content of the subset of media content has been populated into the electronic database based on the information received from the plurality of user equipment devices.

22. A method for providing media content, the method comprising:
at a user equipment device:
causing to be determined, using electronic processing equipment, a geographic location of the user equipment device;
communicating information indicative of the geographic location to one or more servers over a communications network;
causing the one or more servers to:
search an electronic database of media content data to identify at least one landmark associated with the geographic location, to determine that the at least one landmark does not have a line of sight to the geographic location, and to identify a subset of media content of a plurality of media content, wherein:
the subset of media content is associated with the at least one landmark, each media content of the subset of media content corresponds to a different video asset, and
information indicative of the plurality of media content is provided to the one or more servers from a plurality of user equipment devices, and
identify a geographic location of the landmark; and
receiving from the one or more servers data indicative of the subset of media content and data indicative of the geographic location of the landmark using the communications network; and
causing to be simultaneously displayed an indication of the geographic location of the at least one landmark and an indication of the subset of media content.

23. The method of claim 22 wherein causing to be determined the geographic location of the user equipment device comprises causing to be generated geographic location information.

24. The method of claim 22, wherein causing to be simultaneously displayed the indication of the geographic location of the at least one landmark and the indication of the subset of media content is based on a degree of interest in each media content of the subset of media content.

25. The method of claim 22, further comprising causing to be simultaneously displayed a map associated with the geographic location of the landmark.

26. The method of claim 22, further comprising causing to be simultaneously displayed an indication of the geographic location of the user equipment device.

27. The method of claim 22, wherein each media content of the subset of media content has been populated into the electronic database based on the information received from the plurality of user equipment devices.

* * * * *